US012060270B2

(12) United States Patent
Tour et al.

(10) Patent No.: US 12,060,270 B2
(45) Date of Patent: Aug. 13, 2024

(54) FACILE PREPARATION OF CARBON NANOTUBE HYBRID MATERIALS BY CATALYST SOLUTIONS

(71) Applicant: William Marsh Rice University, Houston, TX (US)

(72) Inventors: James M. Tour, Bellaire, TX (US); Rodrigo Villegas Salvatierra, Houston, TX (US); Dante Zakhidov, McKinney, TX (US); Junwei Sha, Tianjin (CN)

(73) Assignee: William Marsh Rice University, Houston, TX (US)

( * ) Notice: Subject to any disclaimer, the term of this patent is extended or adjusted under 35 U.S.C. 154(b) by 470 days.

(21) Appl. No.: 16/811,183

(22) Filed: Mar. 6, 2020

(65) Prior Publication Data

US 2020/0207625 A1    Jul. 2, 2020

Related U.S. Application Data

(62) Division of application No. 15/767,539, filed as application No. PCT/US2017/012706 on Jan. 9, 2017, now abandoned.
(Continued)

(51) Int. Cl.
*H01M 4/139* (2010.01)
*B01J 21/04* (2006.01)
(Continued)

(52) U.S. Cl.
CPC ............ *C01B 32/162* (2017.08); *B01J 21/04* (2013.01); *C01B 32/16* (2017.08); *H01G 11/36* (2013.01);
(Continued)

(58) Field of Classification Search
CPC .......... B01J 21/04; B01J 23/72; B01J 23/745; B82Y 30/00; B82Y 40/00; C01B 2202/22;
(Continued)

(56) References Cited

U.S. PATENT DOCUMENTS 6,440,763 B1   8/2002  Hsu
2011/0039692 A1* 2/2011 Brooks ................ B01J 35/1061
                                                    977/700

(Continued)

FOREIGN PATENT DOCUMENTS

WO    WO-2013-119295 A1    8/2013

OTHER PUBLICATIONS

Kong et al., Nature, vol. 395, 1998, pp. 878-881 (Year: 1998).*
(Continued)

*Primary Examiner* — Vicoria H Lynch
(74) *Attorney, Agent, or Firm* — Dickinson Wright PLLC; Ross Spencer Garsson

(57) ABSTRACT

Embodiments of the present disclosure pertain to methods of making a carbon nanotube hybrid material by depositing a catalyst solution onto a carbon-based material, and growing carbon nanotubes on the carbon-based material such that the grown carbon nanotubes become covalently linked to the carbon-based material through carbon-carbon bonds. The catalyst solution includes a metal component (e.g., iron) and a buffer component (e.g., aluminum) that may be in the form of particles. The metal component of the particle may be in the form of a metallic core or metallic oxide core while the buffer component may be on a surface of the metal component in the form of metal or metal oxides. Further embodiments of the present disclosure pertain to the catalytic particles and carbon nanotube hybrid materials. The carbon nanotube hybrid materials of the present disclosure may be
(Continued)

incorporated as electrodes (e.g., anodes or cathodes) in energy storage devices.

25 Claims, 21 Drawing Sheets

Related U.S. Application Data

(60) Provisional application No. 62/313,574, filed on Mar. 25, 2016, provisional application No. 62/276,126, filed on Jan. 7, 2016.

(51) Int. Cl.

| | |
|---|---|
| *C01B 32/16* | (2017.01) |
| *C01B 32/162* | (2017.01) |
| *H01G 11/36* | (2013.01) |
| *H01M 4/04* | (2006.01) |
| *H01M 4/13* | (2010.01) |
| *H01M 4/36* | (2006.01) |
| *H01M 4/583* | (2010.01) |
| *H01M 4/587* | (2010.01) |
| *H01M 4/66* | (2006.01) |
| *H01M 4/90* | (2006.01) |
| *H01M 4/96* | (2006.01) |
| *B01J 23/72* | (2006.01) |
| *B01J 23/745* | (2006.01) |
| *B82Y 30/00* | (2011.01) |
| *B82Y 40/00* | (2011.01) |
| *H01M 4/02* | (2006.01) |

(52) U.S. Cl.
CPC ........... *H01M 4/0428* (2013.01); *H01M 4/13* (2013.01); *H01M 4/139* (2013.01); *H01M 4/362* (2013.01); *H01M 4/583* (2013.01); *H01M 4/587* (2013.01); *H01M 4/663* (2013.01); *H01M 4/9083* (2013.01); *H01M 4/96* (2013.01); *B01J 23/72* (2013.01); *B01J 23/745* (2013.01); *B82Y 30/00* (2013.01); *B82Y 40/00* (2013.01); *C01B 2202/22* (2013.01); *C01B 2202/32* (2013.01); *C01P 2006/12* (2013.01); *H01M 2004/021* (2013.01); *H01M 2004/027* (2013.01); *Y10S 977/742* (2013.01); *Y10S 977/843* (2013.01); *Y10S 977/948* (2013.01)

(58) Field of Classification Search
CPC ... C01B 2202/32; C01B 32/16; C01B 32/162; C01P 2006/12; H01G 11/36; H01M 2004/021; H01M 2004/027; H01M 4/0428; H01M 4/13; H01M 4/139; H01M 4/362; H01M 4/583; H01M 4/587; H01M 4/663; H01M 4/9083; H01M 4/96; Y02E 60/10; Y02E 60/50; Y10S 977/742; Y10S 977/843; Y10S 977/948

See application file for complete search history.

(56) References Cited

U.S. PATENT DOCUMENTS

| | | | |
|---|---|---|---|
| 2012/0114550 A1* | 5/2012 | Bahattab | C01B 32/162 977/843 |
| 2014/0054179 A1* | 2/2014 | Yamamoto | B01J 23/881 502/316 |
| 2014/0065447 A1* | 3/2014 | Liu | H01G 11/28 429/7 |
| 2014/0313636 A1* | 10/2014 | Tour | C01B 32/16 423/447.2 |

OTHER PUBLICATIONS

Ago, Hiroki et al., Carbon nanotube synthesis using colloidal solution of metal nanoparticles, Physica B 323 (2002) 306-307.

Zhao, Wei et al., Research Article Synthesis of Vertically Aligned Carbon Nanotubes on Silicalite-1 Monolayer-Supported Substrate, Hindawi Publishing Corporation, Journal of Nanomaterials, vol. 2014, Article ID 327398, 5 pages.

Wang, Haitao et al., Chemical Bath Deposition of Aluminum Oxide Buffer on Curved Surfaces for Growing Aligned Carbon Nanotube Arrays, Langmuir DOI: 10.1021/acs.langmuir.5b01002.

Taiwan Ipo; Official Letter and Search Report of TW Patent Application No. 106100622; "Facile Preparation of Carbon Nanotube Hybrid Materials By Catalyst Solutions"; William Marsh Rice University; Sep. 3, 2021.

Taiwan Ipo; Search Report of TW Patent Application No. 106100622; "Facile Preparation of Carbon Nanotube Hybrid Materials By Catalyst Solutions"; William Marsh Rice University; Jan. 8, 2021.

\* cited by examiner

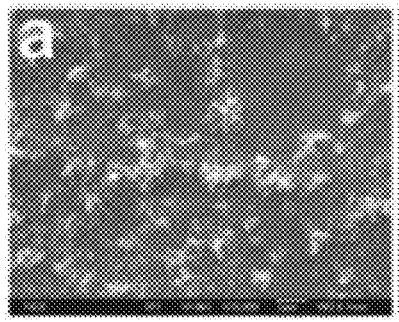
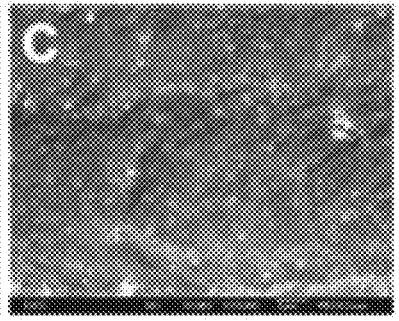
FIG. 7A   FIG. 7B   FIG. 7C
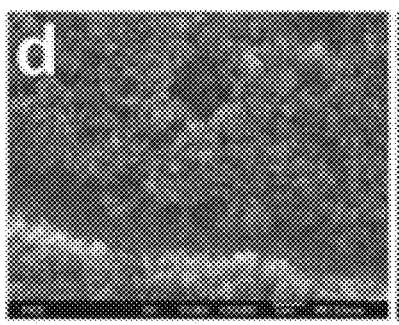
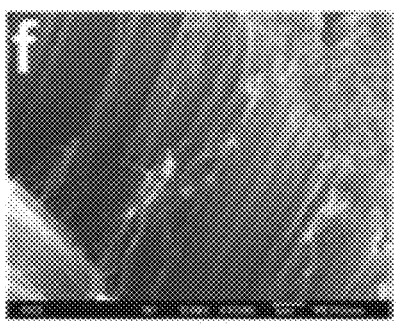
FIG. 7D   FIG. 7E   FIG. 7F
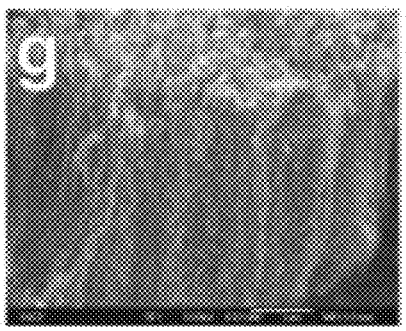
FIG. 7G

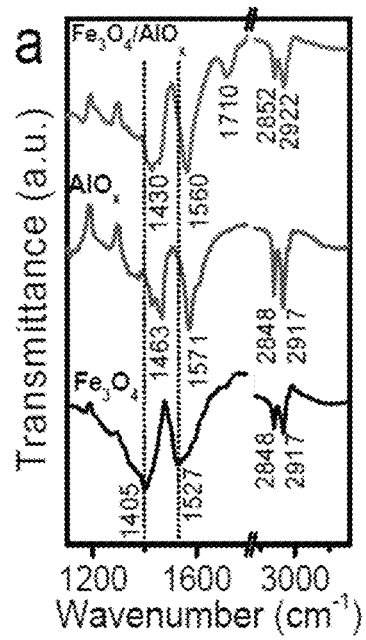
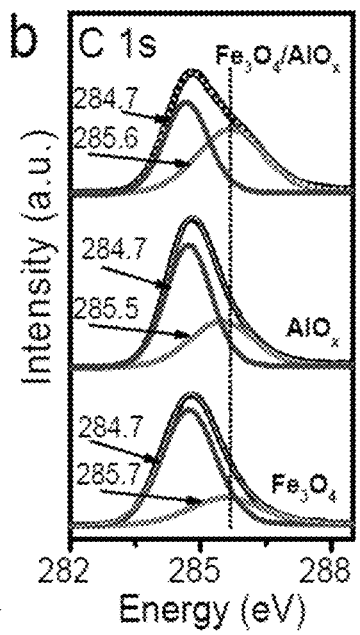
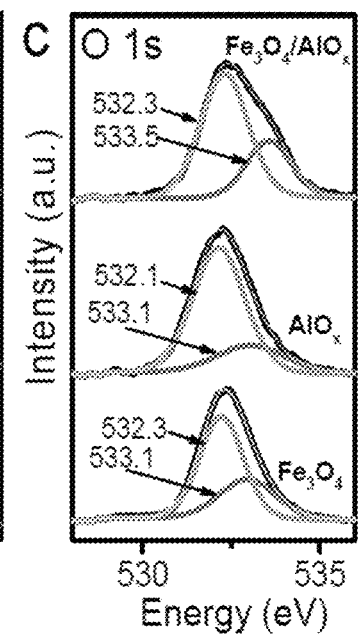
FIG. 9A   FIG. 9B   FIG. 9C
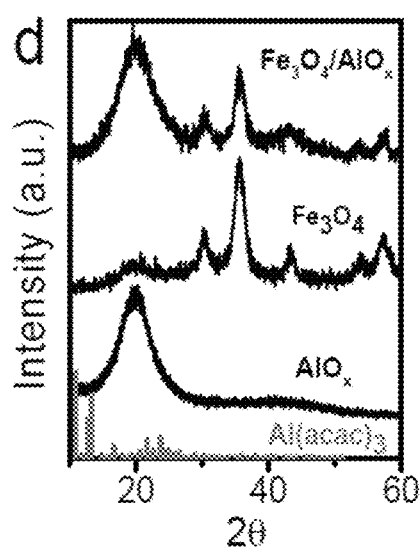
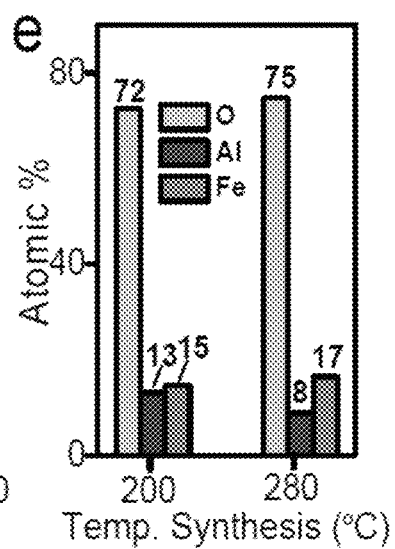
FIG. 9D   FIG. 9E

FACILE PREPARATION OF CARBON NANOTUBE HYBRID MATERIALS BY CATALYST SOLUTIONS

CROSS-REFERENCE TO RELATED APPLICATIONS

This application is a divisional of U.S. non-provisional patent application Ser. No. 15/767,539, filed on Apr. 11, 2018, which is a U.S. national stage application of PCT/US2017/012706, filed on Jan. 9, 2017, which claims priority to U.S. Provisional Patent Application No. 62/276,126, filed on Jan. 7, 2016; and U.S. Provisional Patent Application No. 62/313,574, filed on Mar. 25, 2016. The entirety of each of the aforementioned applications is incorporated herein by reference.

STATEMENT REGARDING FEDERALLY SPONSORED RESEARCH

This invention was made with government support under Grant No. FA 9550-14-1-0111, awarded by the U.S. Department of Defense; and Grant No. FA 9550-12-1-0035, awarded by the U.S. Department of Defense. The government has certain rights in the invention.

BACKGROUND

Seamlessly connected three-dimensional hybrid materials find numerous applications due to their high conductivities and high surface areas. However, current methods of fabricating such three-dimensional structures have numerous limitations, including limited growth on non-planar surfaces and lack of scalability. Various embodiments of the present disclosure address the aforementioned limitations.

SUMMARY

In some embodiments, the present disclosure pertains to methods of making a carbon nanotube hybrid material by depositing a catalyst solution onto a carbon-based material, and growing carbon nanotubes on the carbon-based material such that the grown carbon nanotubes become covalently linked to the carbon-based material through carbon-carbon bonds. In some embodiments, the carbon-based material is associated with a substrate, such as a copper foil.

In some embodiments, the catalyst solution includes a metal component (e.g., iron) and a buffer component (e.g., aluminum). In some embodiments, the metal component and the buffer component are in the form of particles, such as nanoparticles. In some embodiments, the metal component and the buffer component are in the form of oxides (e.g., oxides within particles).

Additional embodiments of the present disclosure pertain to the aforementioned particles that are used to form carbon nanotube hybrid materials. In some embodiments, the metal component of the particle is in the form of a metallic oxide core or a metallic core. In some embodiments, the buffer component of the particle is in the form of clusters or layers on a surface of the metal component (e.g., metallic oxide core or metallic core).

Further embodiments of the present disclosure pertain to the formed carbon nanotube hybrid materials. In some embodiments, the carbon nanotube hybrid materials include a carbon-based material and carbon nanotubes that are covalently linked to the carbon-based material through carbon-carbon bonds. In some embodiments, the carbon-based materials have at least a non-planar or three-dimensional structure. In some embodiments, the carbon nanotubes include vertically aligned carbon nanotubes that are substantially perpendicular to the carbon-based material. In some embodiments, the carbon nanotubes span at least one side of the carbon-based material. In some embodiments, the carbon nanotubes span multiple sides of the carbon-based materials.

In some embodiments, the carbon nanotube hybrid materials of the present disclosure may be incorporated as a component of an energy storage device. For instance, in some embodiments, the carbon nanotube hybrid materials may be utilized as electrodes (e.g., anodes or cathodes) in various energy storage devices, such as capacitors, batteries, electrodes, anodes, cathodes, photovoltaic devices, photovoltaic cells, transistors, current collectors, fuel cells, water splitting devices, and combinations thereof.

FIGURES

FIGS. 1A-1D provide an illustration of a method of forming a carbon nanotube hybrid material (FIG. 1A) a depiction of a catalyst solution for forming the hybrid material (FIG. 1B), a depiction of a formed hybrid material (FIG. 1C), and a depiction of an energy storage device containing the hybrid material (FIG. 1D).

FIGS. 2A-2G provide schemes and data relating to the fabrication of graphene-carbon nanotube (GCNT) hybrid materials. FIG. 2A provides a scheme for the growth of GCNT hybrid materials. FIG. 2B provides a transmission electron microscopy (TEM) image of synthesized $Fe_3O_4$/$AlO_x$ nanoparticles (NPs). FIG. 2C provides an energy dispersive spectrum (EDS) image of Fe (red) and Al (green) distributions in a $Fe_3O_4$/$AlO_x$ binary catalyst deposited onto a TEM grid. FIG. 2D shows an EDS graph of the elemental composition in $Fe_3O_4$/$AlO_x$ NPs with primary emphasis on Fe, Al, and O. FIGS. 2E-G show scanning electron microscopy (SEM) images depicting growth of GCNT forests on graphene-copper (G-Cu, FIG. 2E), carbon fiber (CF) paper (FIG. 2F), and graphene nanoribbon (GNR) paper (FIG. 2G) as the carbon substrate, respectively.

FIG. 3 shows the small angle X-ray scattering (SAXS) curve of $Fe_3O_4$ NPs in hexane produced by colloidal synthetic methods.

FIGS. 4A-4H show images of various GCNTs. FIGS. 4A-C show TEM images of CNTs grown on G-Cu (FIG. 4A), CF paper (FIG. 4B), and GNRs (FIG. 4C), respectively. FIGS. 4D-F show TEM images of CNTs grown on GNR stacks highlighting the connection regions. FIG. 4G shows current versus voltage curves of GCNTs produced by the $Fe_3O_4$/$AlO_x$ binary catalyst (solution method) or the evaporation method. FIG. 4H shows photographs of before and after growth of GCNTs on G-Cu, CF, and GNR substrates.

FIG. 5 shows a TEM image of GCNT produced over a GNR substrate (low magnification).

FIGS. 6A-6B show images and data relating to the fabrication of GCNT hybrid materials from G-Cu substrates. FIG. 6A shows photographs of G-Cu substrates after CNT growth using catalyst solutions with different Al content (from 0 to 100 mol %). FIG. 6B shows Raman spectra of samples obtained in FIG. 6A. The inset shows a magnified portion of the Raman spectra in the low wavenumber region (80-450 $cm^{-1}$).

FIGS. 7A-7G show SEM images of carpets of GCNT produced with different catalyst solutions. FIGS. 7A-B show SEM images of GCNT produced from catalysts with only $Fe_3O_4$ (FIG. 7A) or only $AlO_x$ (FIG. 7B) NPs (0 and 100%

Al content), respectively. FIGS. 7C-G show SEM images of GCNT produced from binary catalysts with Al:Fe ratios of 0.05:1 (FIG. 7C), 0.2:1 (FIG. 7D), 0.5:1 (FIG. 7E), 1:1 (FIG. 7F) and 2:1 (FIG. 7G), respectively.

FIGS. 8A-8B show photographs comparing deposition of different catalysts. FIG. 8A shows GCNT produced from catalysts composed by spin-coating $Fe_3O_4$ NPs followed by $AlO_x$ solution. FIG. 8B shows GCNT produced using $Fe_3O_4$/$AlO_x$ binary catalyst with 1:1 Al:Fe molar ratio.

FIGS. 9A-9G provide various data relating to the characterization of binary catalysts. FIG. 9A shows the infrared (IR) spectra of $Fe_3O_4$, $AlO_x$ and $Fe_3O_4$/$AlO_x$ binary catalyst. FIGS. 9B-C show the X-ray photoelectron spectroscopy (XPS) spectra of $Fe_3O_4$, $AlO_x$ and $Fe_3O_4$/$AlO_x$ at carbon C 1s and O 1s edges. FIG. 9D shows the X-Ray diffraction (XRD) patterns of $Fe_3O_4$, $AlO_x$, $Fe_3O_4$/$AlO_x$ and $Al(acac)_3$. FIG. 9E shows the analysis of $Fe_3O_4$/$AlO_x$ catalysts showing the at % of Al, Fe and O at 200 or 280° C. (measured by EDS/STEM mode). FIGS. 9F-G show SEM images of GCNT grown using $Fe_3O_4$/$AlO_x$ catalyst prepared at 200 or 280° C., respectively. The scale bars in FIG. 9F and FIG. 9G are 3 and 1 μm, respectively.

FIG. 10 shows IR spectra of binary catalysts $Fe_3O_4$/$AlO_x$ with different Al contents (4.7 to 66 mol %).

FIGS. 11A-11B show additional data relating to the characterization of binary catalysts. FIG. 11A shows survey XPS spectra of $AlO_x$, $Fe_3O_4$ and $Fe_3O_4$/$AlO_x$ (50% Al content). The inset shows magnified Al 2p and Al 2s regions (50 to 150 eV). FIG. 11B shows high resolution XPS spectra of Al 2p of $AlO_x$ and $Fe_3O_4$/$AlO_x$ (50% Al content).

FIGS. 12A-12E provide schemes and data relating to the characterization of lithium-ion capacitors (LICs) that contain GCNT-based electrodes fabricated by the use of catalyst solutions. FIG. 12A is a scheme of an LIC during discharge. FIG. 12B shows charge/discharge curves of GCNT-based anodes (0.01 V-3.0 V) and GCNT-based cathodes (1 V-4.5V) in half-cells with Li foil as the counter and reference electrode (0.1 A $g^{-1}$). FIG. 12C shows a Ragone plot of GCNT LIC, compared to (1) carbon symmetric supercapacitor, (2) $MnO_2$/graphene asymmetric supercapacitor, and (3) graphene/activated carbon lithium ion capacitor. FIG. 12D shows the voltage profile of GCNT LIC tested under different rates (0.05 A $g_T^{-1}$ to 2.0 A $g_T^{-1}$). FIG. 12E shows rate testing and long range stability at 1 A $g_T^{-1}$. The inset is the coulombic efficiency (CE) of the long range stability test.

Figure 15A:
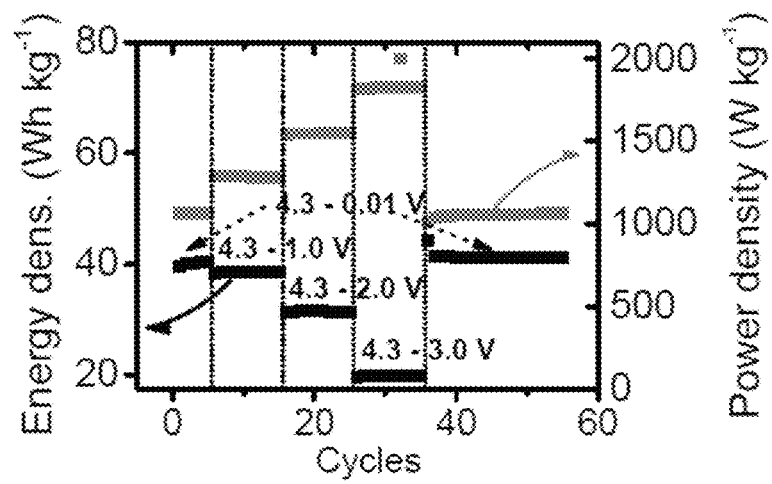
Figure 15B:
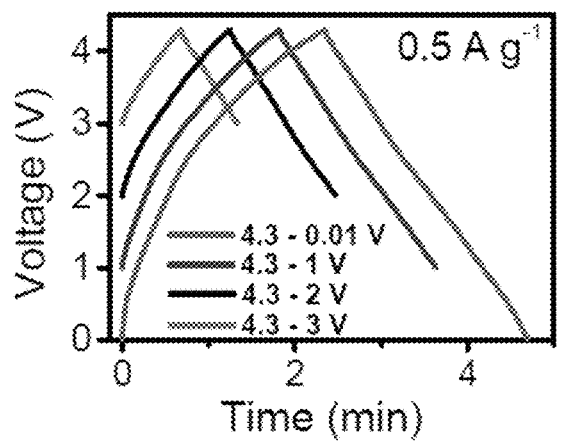
Figure 15C:
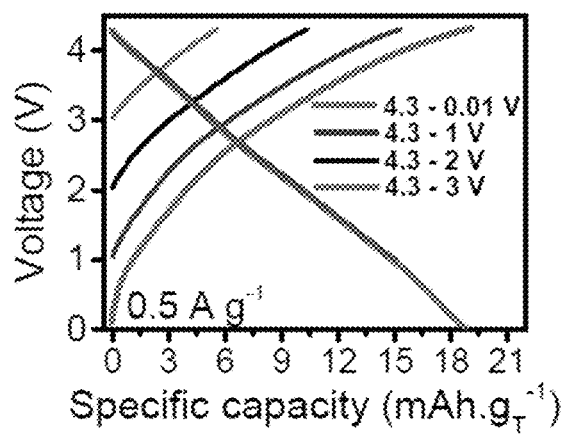

FIGS. 15A-15C show additional data relating to GCNT LICs. FIG. 15A shows the cycling stability of energy density and power density of the LICs tested at different voltage ranges starting at 4.3 to 0.01 V, 4.3 to 2 V, 4.3 to 1 V and back to 4.3 to 0.01 V. FIGS. 15B-C show charge/discharge curves of the LICs at different voltage ranges expressed in voltage versus time and voltage versus specific capacity, respectively. The charge/discharge were run at 0.5 A $g^{-1}$.

Figure 16:
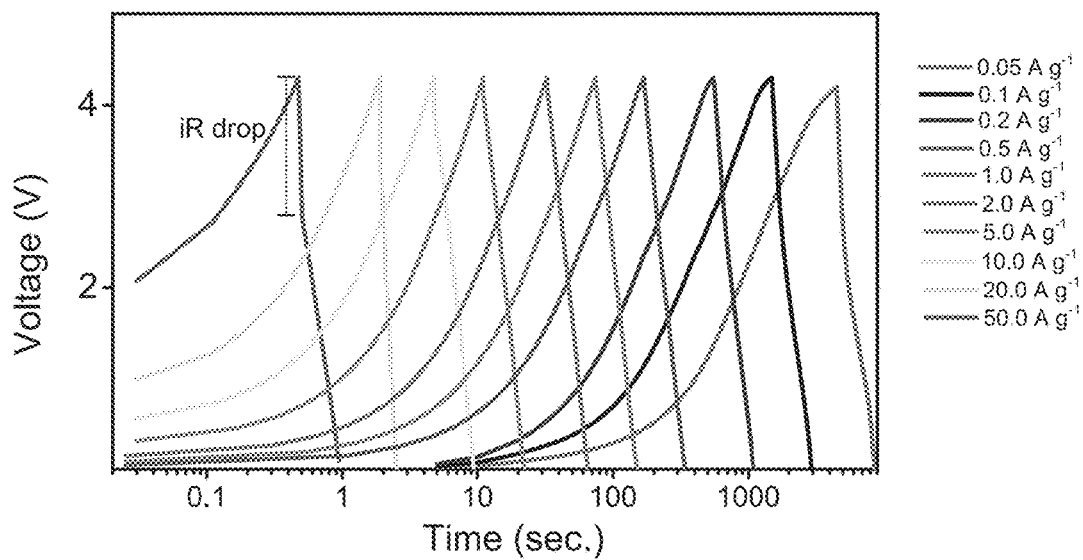

FIG. 16 shows the charge/discharge curves of GCNT LICs at different rates. The iR voltage drop contribution is demonstrated at the highest rate curve (50 A $g^{-1}$).

Figure 17:
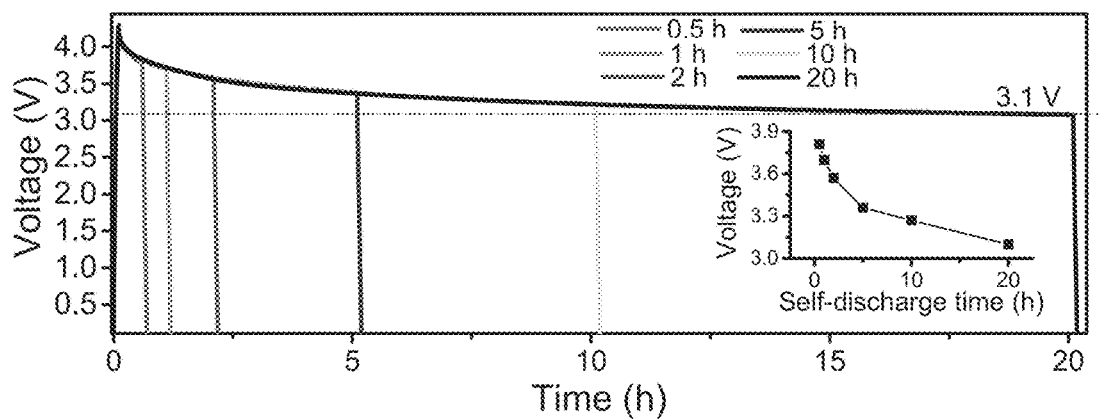

FIG. 17 shows a voltage versus time graph showing the self-discharge of the GCNT LIC at different resting times (from 0.5 to 20 hours). Charge and discharge rates were set to 1 A $g_T^{-1}$ The inset is voltage drop per self-discharge time.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The fabrication of three-dimensional constructs from zero-dimensional, one-dimensional, and two-dimensional nanoscale structures remains an important goal in the development of advanced functional materials. In particular, three-dimensional carbon structures have attracted significant interest due to their advantageous properties, including high conductivity, high surface area, large accessible pore structures, and chemical compatibility. Furthermore, three-dimensional carbon materials have found many applications, including use as high performance electrodes for supercapacitors and field emission devices.

Several strategies have been implemented to fabricate three-dimensional materials. Such strategies have included using self-assembly, hierarchical patterning, and self-folding methodologies.

For instance, the recent development of covalently bonding graphene with carbon nanotube carpets (G-CNT) is an example of a method that extends the exceptional properties of graphene and carbon nanotubes into seamless three-dimensional architectures.

While post-growth organization methods such as layered self-assembly, electrodeposition and liquid phase reaction continue to be used to combine carbon nanotubes and graphene, direct chemical vapor deposition (CVD) growth currently remains the preferred process to ensure the formation of covalent carbon-carbon bonds between graphene and carbon nanotubes. The seamless connection guarantees true ohmic electrical transport while other combinatory methods of graphene and carbon nanotubes produce additional resistance caused by non-covalent interactions.

The resulting carbon nanotube growth from graphene is generally dependent on the design, location and composition of the carbon nanotube growth catalyst. Moreover, the growth of carbon nanotubes from graphene is especially challenging since it requires the local reconstruction of the $sp^2$ structure of graphene to allow the growth of $sp^2$ tubular graphene pillar from a hole created on graphene, which requires the catalyst to follow a tip growth mechanism. Furthermore, existing methods require the utilization of evaporation techniques that are primarily suitable for flat and planar substrates. Such methods are also not readily scalable due to expensive and size-limited e-beam evaporation.

Therefore, a need exists for improved methods of forming three-dimensional carbon materials on non-planar, flexible, and amorphous surfaces in a scalable manner. Various embodiments of the present disclosure address this need.

Figure 1A:
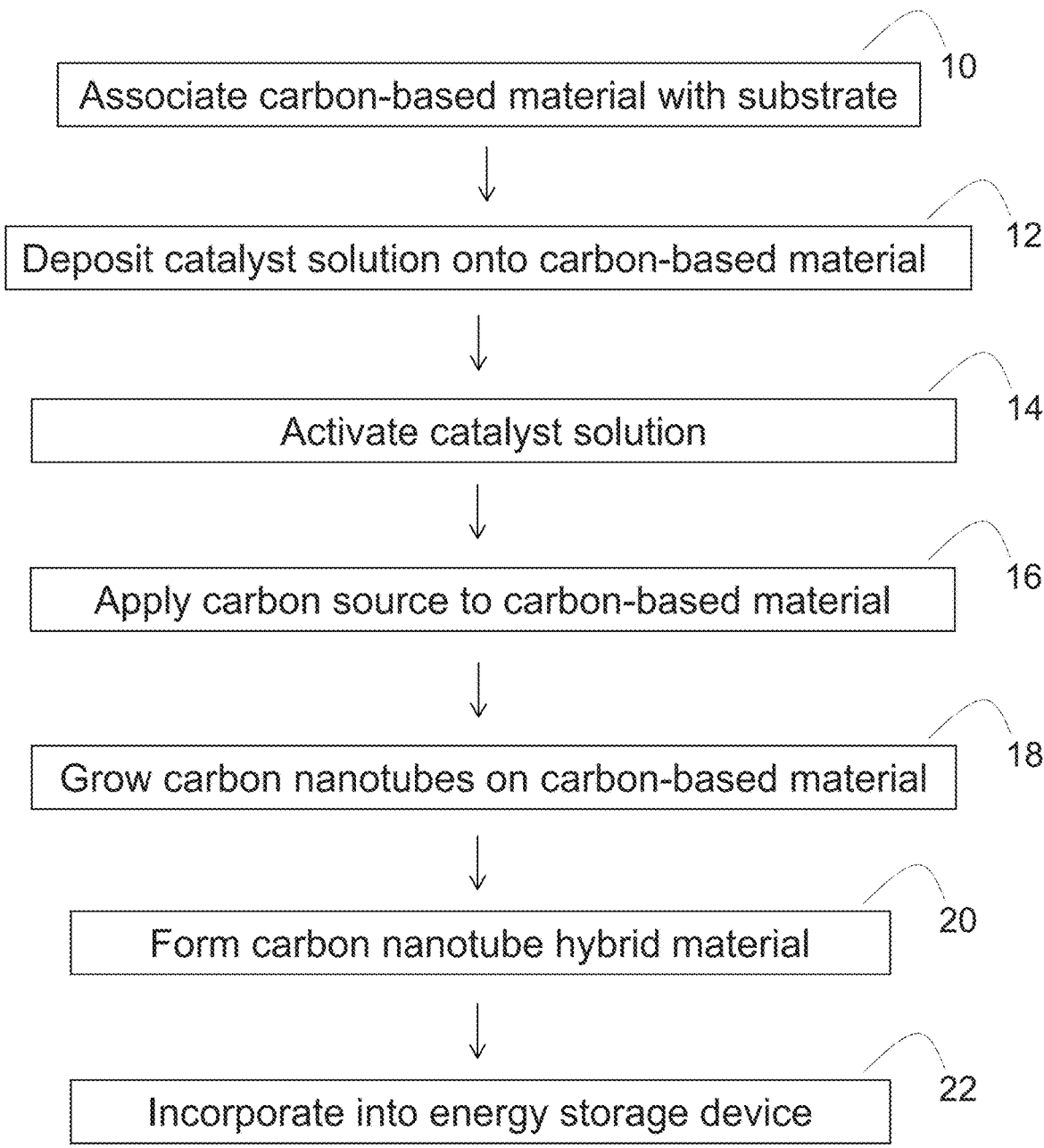

In some embodiments, the present disclosure pertains to methods of making a carbon nanotube hybrid material. In some embodiments, the methods of the present disclosure include a step of depositing a catalyst solution onto a carbon-based material and growing carbon nanotubes on the carbon-based material such that the grown carbon nanotubes become covalently linked to the carbon-based material through carbon-carbon bonds. In more specific embodiments illustrated in FIG. 1A, the methods of the present disclosure include a step of associating a carbon-based material with a substrate (step 10), depositing a catalyst solution onto the carbon-based material (step 12), activating the catalyst solution (step 14), applying a carbon source to the carbon-based material (step 16), and growing carbon nanotubes on the carbon-based material (step 18) to form a carbon nanotube hybrid material (step 20). In additional embodiments, the methods of the present disclosure also include a step of incorporating the formed carbon nanotube hybrid material as a component of an energy storage device (step 22).

Figure 1B:
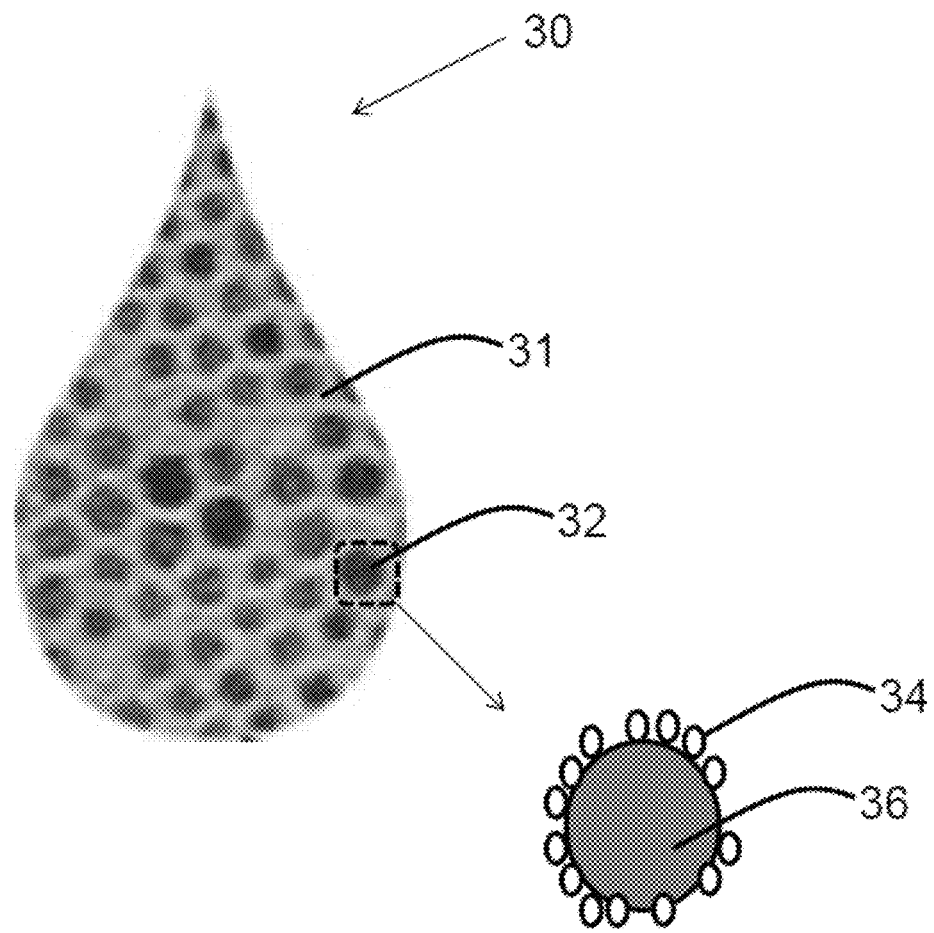

Additional embodiments of the present disclosure pertain to catalyst solutions that are utilized to form carbon nanotube hybrid materials. The catalyst solutions of the present disclosure generally include a metal component and a buffer component. A more specific embodiment of a catalyst solution is illustrated as catalyst solution 30 in FIG. 1B. Catalyst solution 30 generally includes solvent 31 and a plurality of catalytic particles 32 dispersed in the solvent. Catalytic particles 32 contain a metal component 36 (e.g., in the form of a metallic core or a metallic oxide core), and a buffer component 34 (e.g., in the form of clusters) on the surface of the metal component.

Figure 1C:
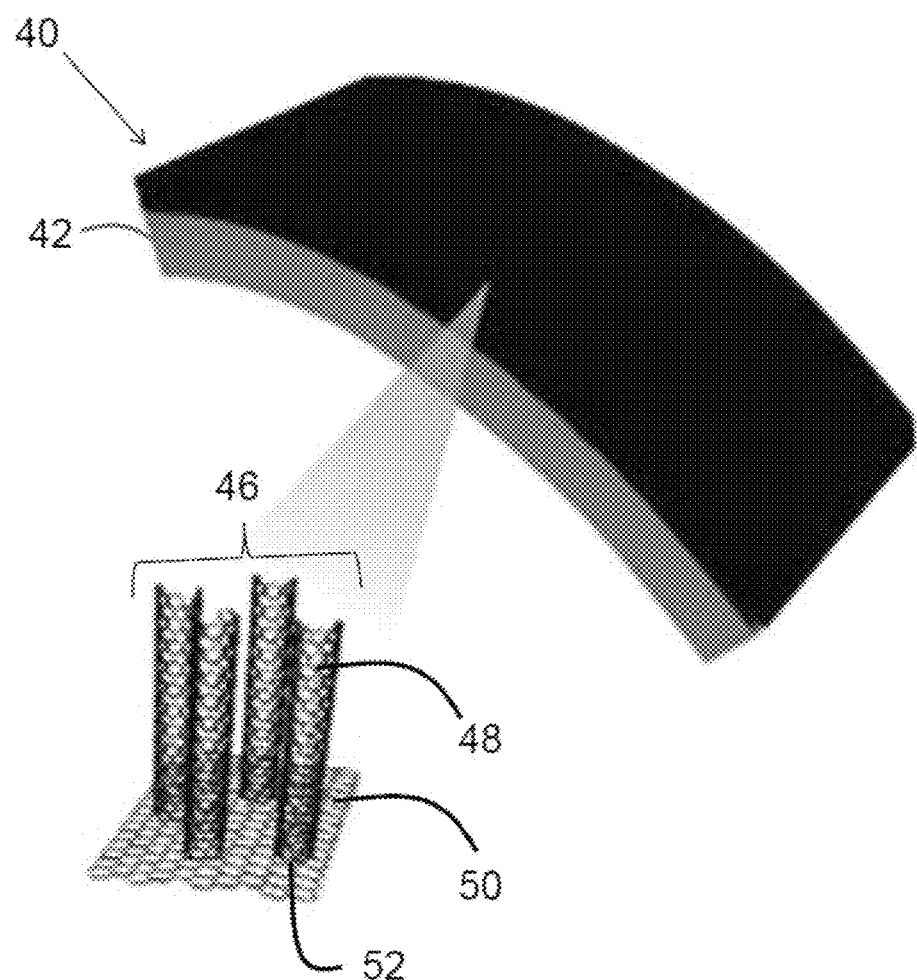

Additional embodiments of the present disclosure pertain to carbon nanotube hybrid materials that are formed by the methods and catalysts of the present disclosure. The carbon nanotube hybrid materials of the present disclosure generally include carbon nanotubes that are covalently linked to carbon-based materials through carbon-carbon bonds. A more specific embodiment of a carbon nanotube hybrid material is illustrated as carbon nanotube hybrid material 40 in FIG. 1C. Carbon nanotube hybrid material 40 is positioned on a surface of substrate 42 and contains a plurality of carbon nanotubes 48 that are covalently linked to carbon-based material 50 through carbon-carbon bonds 52. The carbon nanotubes are in the form of an array 46. In addition, the junctions between the carbon nanotubes and the carbon-based materials are essentially free of most other materials (e.g., other impurities) in this embodiment.

Figure 1D:
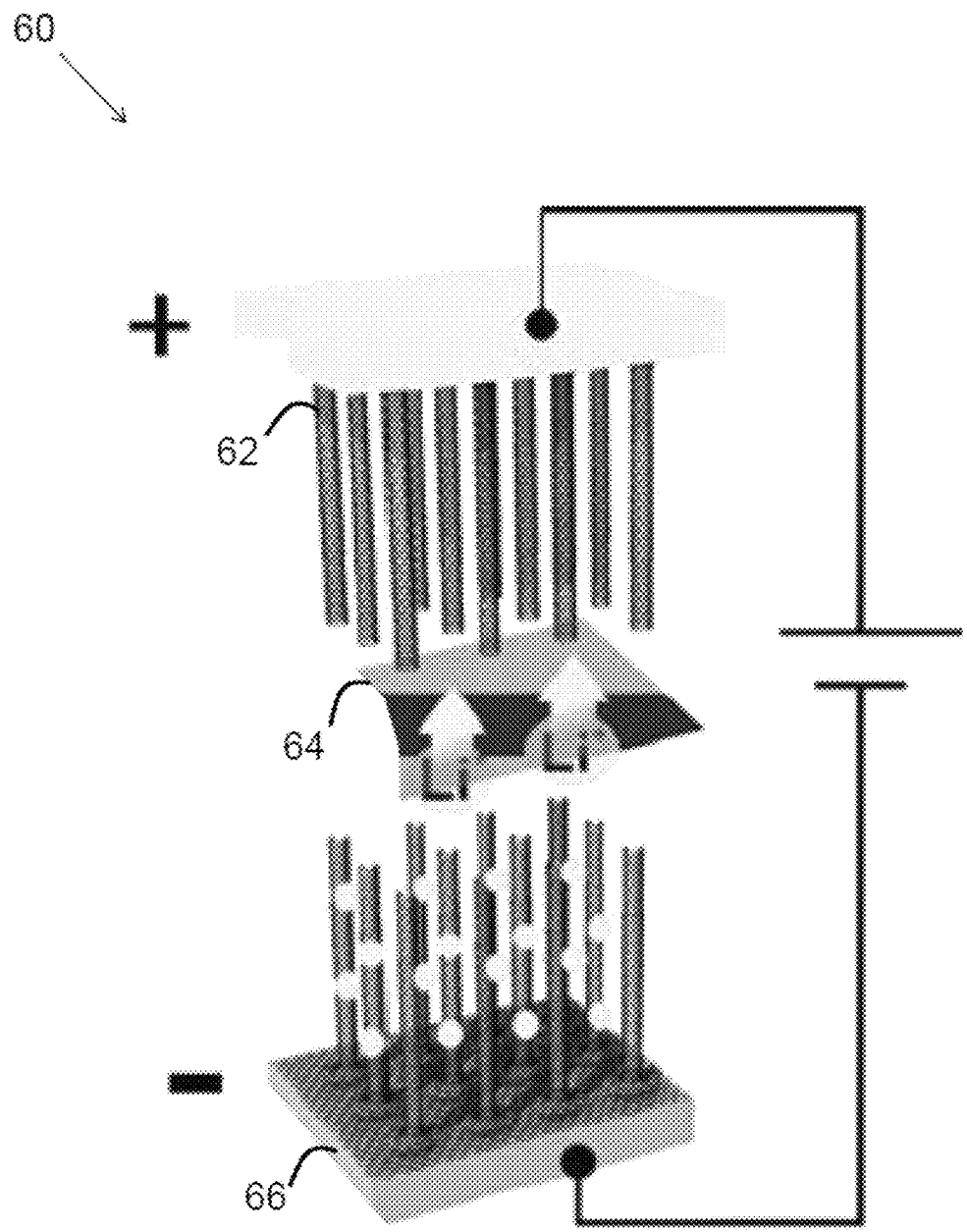

Further embodiments of the present disclosure pertain to energy storage devices that contain the carbon nanotube hybrid materials of the present disclosure. A more specific embodiment of an energy storage device is illustrated as capacitor 60 in FIG. 1D, which contains cathode 62, anode 66, and separator 64. In this embodiment, the carbon nanotube hybrid materials of the present disclosure can serve as cathode 62 or anode 66.

As set forth in more detail herein, the present disclosure can have numerous embodiments. For instance, various catalyst solutions may be deposited onto various carbon-based materials and grown under various conditions to form various types of carbon nanotube hybrid materials. Furthermore, the carbon nanotube hybrid materials may be incorporated into various types of energy storage devices.

Catalyst Solutions

The catalyst solutions of the present disclosure generally include a metal component and a buffer component. In some embodiments, the catalyst solution is in liquid form. In some embodiments, the metal component and the buffer component are dispersed in the catalyst solution. In some embodiments, the metal component and the buffer component are dissolved in the catalyst solution.

The catalyst solutions of the present disclosure can include various types of metal components. For instance, in some embodiments, the metal component of the catalyst solution includes, without limitation, iron, magnesium, nickel, cobalt, palladium, platinum, gold, ruthenium, rhodium, iridium, molybdenum, oxides thereof, chalcogenides thereof, sulfides thereof, alloys thereof, derivatives thereof, and combinations thereof.

In some embodiments, the metal component of the catalyst solution includes iron. In some embodiments, the iron includes, without limitation, iron(III), iron(II), iron oxides, iron sulfides, $Fe_xO_y$, $Fe_xS_y$, and combinations thereof. In more specific embodiments, the metal component of the catalyst solution includes $Fe_xO_y$, such as $Fe_3O_4$.

The use of additional metal components can also be envisioned. For instance, in some embodiments, the metal component can be in the form of metal alloys. In some embodiments, the metal component can be in the form of metal oxides. In some embodiments, the metal component can include a single metal. In some embodiments, the metal component can include more than one metal.

The catalyst solutions of the present disclosure can also include various types of buffer components. For instance, in some embodiments, the buffer component of the catalyst solution includes, without limitation, aluminum, magnesium, silicon, zirconium, oxides thereof, chalcogenides thereof, sulfides thereof, alloys thereof, derivatives thereof, and combinations thereof.

In some embodiments, the buffer component of the catalyst solution includes aluminum. In some embodiments, the aluminum includes, without limitation, aluminum oxide, Al(III), $AlO_x$, $Al_2O_3$, functionalized derivatives thereof, and combinations thereof. In some embodiments, the buffer component includes $AlO_x$.

In some embodiments, the buffer component is functionalized with functional groups. For instance, in some embodiments, the buffer component includes $(AlO_x)_n$ functionalized by oleic acid.

The use of additional buffer components can also be envisioned. For instance, in some embodiments, the buffer component can include other metal oxides such as $ZrO_2$, $SiO_2$, and combinations thereof. In some embodiments, the buffer component may include a single metal oxide. In some embodiments, the buffer component may include multiple metal oxides.

The metal components and buffer components of catalyst solutions may be in various forms. For instance, in some embodiments, the metal component and the buffer component are in the form of oxides. In some embodiments, the metal component and the buffer component are in the form of particles (e.g., particles 32 shown in FIG. 1B). In some embodiments, the metal component in the particle is in the form of a metallic core or a metallic oxide core (e.g., metal component 36 shown in FIG. 1B). In some embodiments, the metal component is in crystalline form.

In some embodiments, the metal component of the catalyst solution is in the form of a metallic oxide core. In some embodiments, the metal component of the catalyst solution is in the form of a metallic core. In some embodiments, the metal component of the catalyst solution is in the form of a metallic core and a metallic oxide core. In some embodiments, the metal component is in the form of a metallic alloy core. In some embodiments, the metal component is in the form of a metallic oxide core that forms a metallic core after activation.

In some embodiments, the buffer component is on a surface of the metal component (e.g., metallic core or metallic oxide core). For instance, in some embodiments, the buffer component partially or completely coats the metal component (e.g., metallic core or metallic oxide core). In some embodiments, the buffer component is in the form of clusters on the surface of the metal component (e.g., clusters 34 shown in FIG. 1B). In some embodiments, the buffer component is in amorphous form. In some embodiments, the buffer component is in the form of a layer on the surface of the metal component (e.g., metallic core or metallic oxide core). In some embodiments, the buffer component is in the form of oxides. In some embodiments, the buffer component and the metal component of a catalytic particle are in the form of oxides.

The catalytic particles of the present disclosure can include various molar ratios of buffer components to metal components. For instance, in some embodiments, the molar ratio of the buffer component to the metal component in the particles ranges from about 0.01:1 to about 2:1. In some embodiments, the molar ratio of the buffer component to the metal component is about 0.05:1. In some embodiments, the molar ratio of the buffer component to the metal component is about 0.2:1. In some embodiments, the molar ratio of the buffer component to the metal component is about 0.5:1. In some embodiments, the molar ratio of the buffer component to the metal component is about 1:1. In some embodiments, the molar ratio of the buffer component to the metal component is about 2:1. In some embodiments, the buffer component includes a molar content of at least about 50% of the particle. Additional molar ratios can also be envisioned.

The catalytic particles of the present disclosure can also include various shapes. For instance, in some embodiments, the particles are in the form of rectangles, cubes, spheres, and combinations of such shapes. In some embodiments, the particles are in the form of spheres. Additional particle shapes can also be envisioned.

The catalytic particles of the present disclosure can also include various sizes. For instance, in some embodiments, the particles have diameters ranging from about 1 nm to about 10 mm. In some embodiments, the particles have diameters ranging from about 1 nm to about 100 μm. In some embodiments, the particles have diameters ranging from about 1 nm to about 100 nm. In some embodiments, the particles have diameters ranging from about 1 nm to about 50 nm. In some embodiments, the particles have diameters ranging from about 1 nm to about 25 nm. Additional particle sizes can also be envisioned.

The catalytic particles of the present disclosure can be distributed in catalyst solutions in various manners. For instance, in some embodiments, the particles are homogeneously distributed in the catalyst solution. In some embodiments, the particles are dissolved in the catalyst solution.

In some embodiments, the catalyst solutions of the present disclosure also include a solvent. In some embodiments, the solvent includes, without limitation, organic solvents, aqueous solvents, and combinations thereof. In some embodiments, the solvent includes an organic solvent. In some embodiments, the organic solvent includes, without limitation, hexanes, xylenes, methanol, water, benzene, dimethyl formamide, and combinations thereof. In some embodiments, the organic solvent includes hexanes.

In some embodiments, the solvent includes an aqueous solvent. In some embodiments, the aqueous solvent also includes a surfactant. In some embodiments, the solvent includes a combination of aqueous and organic solvents.

In some embodiments, the catalyst solutions of the present disclosure also include a dispersing agent. In some embodiments, the dispersing agent includes, without limitation, surfactants, oils, fatty acids, amines, and combinations thereof. In some embodiments, the dispersing agent includes oleic acid.

Depositing Catalyst Solutions onto Carbon-Based Materials

Various methods may be utilized to deposit the catalyst solutions of the present disclosure onto carbon-based materials. For instance, in some embodiments, the depositing occurs by at least one of coating, spin coating, dip coating, printing, filtration, ultrafiltration, spraying, spray coating, doctor-blade coating, screen printing, gravure printing, direct write printing, inkjet printing, mechanical pressing, melting, and combinations thereof. In some embodiments, the depositing occurs by spin coating. In some embodiments, the depositing occurs by dip coating.

In some embodiments, the catalyst solutions of the present disclosure are deposited onto carbon-based materials in a single step. In some embodiments, the depositing occurs without the use of any evaporation methods. For instance, in some embodiments, the depositing occurs without the use of e-beam evaporation.

Catalyst Activation

In some embodiments, the methods of the present disclosure also include a step of activating the catalyst solutions of the present disclosure. In some embodiments, the activation occurs after the catalyst solution is deposited onto carbon-based materials. In some embodiments, the activation occurs before the catalyst solution is deposited onto carbon-based materials. In some embodiments, the activation occurs during the deposition of the catalyst solution onto carbon-based materials.

Various methods may be utilized to activate the catalyst solutions of the present disclosure. For instance, in some embodiments, the activation occurs by reduction. In some embodiments, the reduction occurs by exposure of the catalyst solution to a reducing agent, such as atomic hydrogen, ammonia, and combinations thereof. In some embodiments, the reducing agent may be in a gaseous form. In some embodiments, the reducing agent may include gaseous mixtures of ammonia and hydrogen.

In some embodiments, the activation occurs by heating. In some embodiments, the heating occurs at high temperatures, such as temperatures above 500° C.

In some embodiments, the activation occurs by thermal reduction. For instance, in some embodiments, the catalyst solutions of the present disclosure are activated by exposure to a reducing agent (e.g., atomic hydrogen) in the presence of heat (e.g., temperatures above 500° C.).

Activation steps can have various effects on the catalyst solutions of the present disclosure. For instance, in some embodiments, the activation step results in the reduction of the metal and buffer components of the catalyst solution. In some embodiments, the activation step results in the conversion of a metal component's metallic oxide core into a metallic core. In some embodiments, the activation results in the conversion of a buffer component's metal oxide into a reduced metal. In more specific embodiments, the activation step results in the conversion of $Fe_3O_4$ and $AlO_x$ into metallic Fe and $Al_2O_3$, respectively.

Carbon-Based Materials

The catalyst solutions of the present disclosure may be deposited onto various carbon-based materials. In addition, the carbon nanotube hybrid materials of the present disclosure can include various types of carbon-based materials. For instance, in some embodiments, the carbon-based materials include, without limitation, two-dimensional carbon-based materials, three-dimensional carbon-based materials, carbon fibers, carbon fiber papers, graphene nanoribbons, graphene ribbons, carbon films, graphene films, graphite, bucky papers, fullerenes, graphene papers, graphene nanoplatelets, graphene quantum dots, graphene oxides, reduced graphene oxides, asphalt, asphalt-derived carbons, activated charcoal, coal, anthracite, bituminous coal, diamonds, nanodiamonds, functionalized carbon-based materials, porous carbons, composites thereof, and combinations thereof.

The carbon-based materials of the present disclosure can include various shapes. For instance, in some embodiments, the carbon-based materials of the present disclosure include a flat surface. In some embodiments, the carbon-based materials of the present disclosure include a non-flat surface. In some embodiments, the carbon-based materials of the present disclosure include a three-dimensional structure. In some embodiments, the carbon-based materials of the present disclosure include a non-planar structure. In some embodiments, the carbon-based materials of the present disclosure include a porous structure. In some embodiments, the carbon-based materials of the present disclosure include a fibrous structure. In some embodiments, the carbon-based materials of the present disclosure include a tubular structure. In some embodiments, the carbon-based materials of the present disclosure include a cylindrical structure. Additional structures can also be envisioned.

In some embodiments, the carbon-based materials of the present disclosure include functionalized carbon-based materials that contain a plurality of functional groups. In some embodiments, the functional groups include, without limitation, hydrophilic groups, hydroxyl groups, small organic molecules, adamantane derivatives, alkyl groups, alcohol groups, carboxyl groups, carbonyl groups, alkoxy groups, aryl groups, aryl sulfonyl groups, polymers, halogen groups, fluorine atoms, chlorine atoms, bromine atoms, iodine atoms, sulfur atoms, and combinations thereof.

The carbon-based materials of the present disclosure can include a number of layers. For instance, in some embodiments, the carbon-based materials include a single layer. In some embodiments, the carbon-based materials include a plurality of layers. In some embodiments, the carbon-based materials include from about 2 layers to about 10 layers. In some embodiments, the carbon-based materials can be a bulk material.

In more specific embodiments, the carbon-based materials include a graphene film. In some embodiments, the graphene film includes, without limitation, laser-induced graphene, n-doped graphene, nitrogen-atom-doped graphene, boron-atom-doped graphene, nitrogen- and boron co-doped graphene, sulfur-doped graphene, phosphorous doped graphene, monolayer graphene, few-layer graphene, double-layer graphene, triple-layer graphene, multi-layer graphene, reduced graphene oxide, and combinations thereof.

In some embodiments, the graphene film includes laser-induced graphene. In some embodiments, the laser-induced graphene may be derived from various polymers, such as polyimide and polyetherimide. In some embodiments, the laser-induced graphene may be derived from various carbon containing crystals, such as silicon carbide. Suitable methods of forming laser-induced graphenes have been described in Applicants' prior patent applications, including International Application No. PCT/US2015/016165, filed on Feb. 17, 2015; International Application No. PCT/US2015/ 062832, filed on Nov. 27, 2015; and U.S. Provisional Patent Application No. 62/352,744, filed on Jun. 21, 2016.

In some embodiments, the carbon-based materials of the present disclosure include graphene nanoribbons. In some embodiments, the graphene nanoribbons include, without limitation, unfunctionalized graphene nanoribbons, pristine graphene nanoribbons, doped graphene nanoribbons, functionalized graphene nanoribbons, edge-functionalized graphene nanoribbons, graphene oxide nanoribbons, reduced graphene oxide nanoribbons, single-layer graphene nanoribbons, few-layer graphene nanoribbons, multi-layer graphene nanoribbons, and combinations thereof.

The graphene nanoribbons of the present disclosure can include various layers. For instance, in some embodiments, the graphene nanoribbons of the present disclosure include a single layer. In some embodiments, the graphene nanoribbons of the present disclosure include a plurality of layers. In some embodiments, the graphene nanoribbons of the present disclosure include from about 2 layers to about 60 layers. In some embodiments, the graphene nanoribbons of the present disclosure include from about 2 layers to about 10 layers.

The graphene nanoribbons of the present disclosure may be derived from various carbon sources. For instance, in some embodiments, the graphene nanoribbons of the present disclosure may be derived from carbon nanotubes, such as multi-walled carbon nanotubes. In some embodiments, the graphene nanoribbons of the present disclosure are derived through the longitudinal splitting (or "unzipping") of carbon nanotubes. Various methods may be used to split (or "unzip") carbon nanotubes to form graphene nanoribbons. In some embodiments, carbon nanotubes may be split by exposure to potassium, sodium, lithium, alloys thereof, metals thereof, salts thereof, and combinations thereof. In some embodiments, the graphene nanoribbons of the present disclosure are made by the longitudinal splitting of carbon nanotubes using oxidizing agents (e.g., $KMnO_4$). In some embodiments, the graphene nanoribbons of the present disclosure are made by the longitudinal opening of carbon nanotubes (e.g., multi-walled carbon nanotubes) through in situ intercalation of Na/K alloys into the carbon nanotubes. In some embodiments, the intercalation may be followed by quenching with a functionalizing agent (e.g., 1-iodohexadecane) to result in the production of functionalized graphene nanoribbons (e.g., hexadecyl-functionalized graphene nanoribbons). Additional methods of fabricating graphene nanoribbons are described in Applicants' prior patents, including at least U.S. Pat. No. 9,493,355, issued on Nov. 15, 2016; and U.S. Pat. No. 8,992,881, issued on Mar. 31, 2015.

Substrates

In some embodiments, the carbon-based materials of the present disclosure are free-standing. In some embodiments, the carbon-based materials of the present disclosure are not associated with any substrates. In some embodiments, the carbon-based materials of the present disclosure are associated with a substrate.

The carbon-based materials of the present disclosure may be associated with various substrates. In some embodiments, the substrate may be a conductive substrate, such as a current collector substrate. In some embodiments, the substrate may be a metal or an alloy. In some embodiments, the substrate can include, without limitation, Ni, Co, Fe, Pt, Au, Al, Cr, Cu, Mg, Mn, Mo, Rh, Si, Ta, Ti, W, U, V, Zr, $Si_{O2}$, $A_{l2O3}$, BN, diamond, alloys thereof, and combinations thereof. In some embodiments, the substrate includes a copper foil.

In some embodiments, the substrate includes a porous substrate. In some embodiments, the porous substrate includes porous nickel.

The substrates of the present disclosure can have various shapes. For instance, in some embodiments, the substrate includes a three-dimensional structure. In some embodiments, the substrate includes a two-dimensional structure. In some embodiments, the substrate may be circular, oval, rectangular, square-like, foam-like, or amorphous.

In some embodiments, the methods of the present disclosure may also include a step of associating carbon-based materials with a substrate. For instance, in some embodiments, the association may occur by transferring a pre-formed carbon-based material onto the substrate. In other embodiments, the association may occur by forming the carbon-based material on the substrate.

Various methods may be utilized to form carbon-based materials on a substrate. For instance, in some embodiments, the carbon-based material is formed on the substrate by chemical vapor deposition. In some embodiments, chemical vapor deposition may occur at high temperatures, such as temperatures that range from about 750° C. to about 1,000° C. In some embodiments, the chemical vapor deposition may occur at temperatures of about 1,000° C. Additional methods of forming carbon-based materials on substrates are disclosed in Applicants' prior patents, including U.S. Pat. No. 9,096,437, issued on Aug. 4, 2015; and U.S. Pat. No. 9,455,094, issued on Sep. 27, 2016.

Patterning of Carbon-Based Materials

In some embodiments, the carbon-based materials of the present disclosure are patterned. For instance, in some embodiments, the carbon-based materials of the present disclosure are patterned on a surface of a substrate. In additional embodiments, the methods of the present disclosure also include a step of patterning the carbon-based materials.

Patterning of carbon-based materials can occur by various methods. For instance, in some embodiments, the patterning occurs by photolithography. In some embodiments, the patterning occurs by reactive ion etching. Additional patterning methods may also be envisioned.

Patterning of carbon-based materials can occur at various stages of carbon nanotube hybrid material formation. For instance, in some embodiments, the patterning occurs before the deposition of catalyst solutions onto a carbon-based material. In some embodiments, the patterning occurs before the growing of carbon nanotubes on the carbon-based materials.

Patterning of carbon-based materials can have various effects on carbon nanotube growth. For instance, in some embodiments, patterning can result in the selective growth of carbon nanotubes on the patterned areas of the carbon-based materials. In some embodiments, the carbon nanotubes only grow on the patterned areas of the carbon-based materials, but not the exposed substrates.

Patterning of carbon-based materials can also be used to form carbon nanotube hybrid materials with desired structures. For instance, in some embodiments, the carbon-based materials of the present disclosure can be patterned such that the grown carbon nanotubes form an interdigitated pattern on a surface of a substrate.

Growth of Carbon Nanotubes on Carbon-Based Materials

Various methods may be utilized to grow carbon nanotubes on carbon-based materials. For instance, in some embodiments, the growing of carbon nanotubes includes a heating step. In some embodiments, the heating occurs at temperatures of more than about 500° C. In some embodiments, the heating occurs at temperatures ranging from about 500° C. to about 1,100° C.

Carbon nanotubes may be grown for various periods of time. For instance, in some embodiments, carbon nanotube growth time ranges from about 1 minute to about 120 minutes. In some embodiments, carbon nanotube growth time ranges from about 1 minute to about 10 minutes. In some embodiments, carbon nanotube growth time ranges from about 1 minute to about 6 minutes.

Various conditions may be used to grow carbon nanotubes. For instance, in some embodiments, carbon nanotubes may be grown under atmospheric pressure. In some embodiments, carbon nanotubes may be grown under a stream of one or more gases at various flow rates. In more specific embodiments, the carbon nanotubes may be grown under a steady stream of ethylene, hydrogen, argon, or combinations of such gases.

In some embodiments, the methods of the present disclosure may also include a step of controlling the length of the grown carbon nanotubes. In some embodiments, the length of the carbon nanotubes may be controlled by adjusting the growth time of the carbon nanotubes. For instance, in some embodiments, the length of the grown carbon nanotubes may be adjusted from about 3 μm to 250 μm by adjusting the growth time to about 1 minute, 6 minutes, or 10 minutes. In further embodiments, the length of the grown carbon nanotubes may be controlled by adjusting the carbon nanotube growth time from about 1 minute to about 120 minutes. In some embodiments, the carbon nanotube growth time may be adjusted by adjusting the heating time of a sample that contains the growing carbon nanotube.

In some embodiments, carbon nanotube growth time may be controlled by changing the environment of the sample. For instance, in some embodiments, the carbon nanotubes may be grown in a heating chamber (e.g., furnace) for a desired amount of time. Thereafter, the carbon nanotubes may be removed from the heating chamber to cease or slow down the growth of carbon nanotubes.

Without being bound by theory, it is envisioned that the growth of carbon nanotubes can occur by various mechanisms. For instance, in some embodiments, the metal component and the buffer component of the catalyst solution are lifted off from the carbon-based materials by the carbon nanotubes during the carbon nanotube growth. In some embodiments, the carbon-based material serves as a carbon source for the growth of the carbon nanotubes.

In additional embodiments, a carbon source is applied to the carbon-based material in order to facilitate the growth of carbon nanotubes. As such, in some embodiments, the methods of the present disclosure also include a step of applying a carbon source to the carbon-based material. In some embodiments, the applying occurs prior to or during the growing step.

Various methods may be utilized to apply carbon sources to carbon-based materials. For instance, in some embodiments, the applying occurs by electron beam deposition. In some embodiments, the applying occurs by electron beam evaporation. Additional carbon source application methods can also be envisioned.

Various carbon sources may be applied to carbon-based materials. For instance, in some embodiments, the carbon source includes, without limitation, alkanes, alkenes, alkylenes, alkynes, polymers, carbon oxides, and combinations thereof. In some embodiments, the carbon sources may include methane, ethane, ethylenes, carbon monoxides, carbon dioxides, and combinations thereof. In some embodiments, the carbon sources may be mixed with hydrogen or dihydrogen. The use of additional carbon sources for growing carbon nanotubes can also be envisioned.

In some embodiments, the methods of the present disclosure also include a step of drying the grown carbon nanotubes. Various methods may be utilized to dry carbon nanotubes. For instance, in some embodiments, the drying occurs by exposing the carbon nanotubes to carbon dioxide. In some embodiments, the drying occurs by a critical point drying (CPD) step. In some embodiments, the drying step removes any absorbed solvent from the grown carbon nanotubes.

Carbon Nanotube Hybrid Materials

Additional embodiments of the present disclosure pertain to carbon nanotube hybrid materials that are formed by the methods and catalysts of the present disclosure. The carbon nanotube hybrid materials of the present disclosure generally include carbon nanotubes that are covalently linked to carbon-based materials through carbon-carbon bonds. In some embodiments, the carbon-carbon bonds are at one or more junctions between the carbon nanotubes and the carbon-based material. In some embodiments, the one or more junctions are substantially or significantly free of any impurities. In some embodiments, the carbon nanotubes are in ohmic contact with the carbon-based material through the carbon-carbon bonds at the one or more junctions. In some embodiments, the one or more junctions include seven-membered carbon rings. In some embodiments, the one or more junctions are seamless.

The carbon nanotube hybrid materials of the present disclosure may include various types of carbon nanotubes. For instance, in some embodiments, the carbon nanotubes include, without limitation, single-walled carbon nanotubes, double-walled carbon nanotubes, triple-walled carbon nanotubes, multi-walled carbon nanotubes, ultra-short carbon nanotubes, small diameter carbon nanotubes, pristine carbon nanotubes, functionalized carbon nanotubes, and combinations thereof.

The carbon nanotubes of the present disclosure may have various lengths. For instance, in some embodiments, the lengths of the carbon nanotubes may range from about 3 μm to about 250 μm. In some embodiments, the lengths of the carbon nanotubes are more than about 100 μm. In some embodiments, the lengths of the carbon nanotubes are more than about 200 μm.

In some embodiments, the carbon nanotubes of the present disclosure include small diameter carbon nanotubes. In some embodiments, the small diameter carbon nanotubes have diameters of less than about 25 nm. In some embodiments, the small diameter carbon nanotubes have diameters of less than about 15 nm. In some embodiments, the small diameter carbon nanotubes have diameters ranging from about 4 nm to about 10 nm The carbon nanotubes of the present disclosure can have various shapes and geometries. For instance, in some embodiments, the carbon nanotubes of the present disclosure are in the form of bundles. In some embodiments, the carbon nanotubes of the present disclosure are in the form of carpets. In some embodiments, the carbon nanotubes of the present disclosure are in the form of arrays.

The carbon nanotubes of the present disclosure may be associated with various types of carbon-based materials. Suitable carbon-based materials were described previously. For instance, in some embodiments, the carbon-based materials include non-planar or three-dimensional carbon-based materials. In some embodiments, the carbon-based materials may be free-standing. In some embodiments, the carbon-based materials may be associated with a substrate.

In some embodiments, the carbon nanotubes may have various orientations with respect to carbon-based materials. For instance, in some embodiments, the carbon nanotubes may include vertically aligned carbon nanotubes that are perpendicular or substantially perpendicular to the carbon-based materials. In some embodiments, the carbon nanotubes may include horizontally aligned carbon nanotubes that are parallel or substantially parallel to the carbon-based material.

Furthermore, the carbon nanotubes may be at various angles with respect to the carbon-based material. For instance, in some embodiments, the carbon nanotubes may be at angles of 90°, 60°, or 30° with respect to the carbon-based material.

In some embodiments, the carbon nanotubes span at least one side of the carbon-based material. In some embodiments, the carbon nanotubes span multiple sides of the carbon-based materials. In some embodiments, the carbon nanotubes are infiltrated within pores of the carbon-based materials.

The carbon nanotube hybrid materials of the present disclosure may have various surface areas. For instance, in some embodiments, the carbon nanotube hybrid materials have a surface area of more than about 650 $m^2/g$. In some embodiments, the carbon nanotube hybrid materials have a surface area of more than about 2,000 $m^2/g$. In some embodiments, the carbon nanotube hybrid materials have a surface area of more than about 2,500 $m^2/g$. In some embodiments, the carbon nanotube hybrid materials have a surface area ranging from about 2,000 $m^2/g$ to about 3,000 $m^2/g$.

Separation of Carbon Nanotube Hybrid Materials from Substrates

In some embodiments, the methods of the present disclosure also include a step of separating formed carbon nanotube hybrid materials from a substrate. In some embodiments, the separation forms free-standing carbon nanotube hybrid materials.

Separation can occur by various methods. For instance, in some embodiments, the separation occurs by etching the substrate from the carbon nanotube hybrid material. In some embodiments, the etching may include the use one or more etchants. In some embodiments, the etchants include, without limitation, HCl, $FeCl_3$, water, and combinations thereof.

In some embodiments, the separation occurs by dissolving the substrate in a solvent. Additional separation methods can also be envisioned. For instance, additional separation methods have been published by Applicants. See, e.g., Nano Lett. 2016, 16, 1287-1292.

Transfer of Carbon Nanotube Hybrid Materials to Another Substrate

In some embodiments, the methods of the present disclosure also include a step of transferring the carbon nanotube hybrid material to another substrate. In some embodiments, the transfer occurs without affecting the structure of the carbon nanotube hybrid material. In some embodiments, the transfer occurs without the need for a polymer support.

Use of Carbon Nanotube Hybrid Materials as Energy Storage Device Components

In some embodiments, the carbon nanotube hybrid materials of the present disclosure can be utilized as one or more components of an energy storage device. As such, in additional embodiments, the methods of the present disclosure also include a step of incorporating carbon nanotube hybrid materials as one or more components of an energy storage device.

The carbon nanotube hybrid materials of the present disclosure may be incorporated into various energy storage devices. For instance, in some embodiments, the energy storage device includes, without limitation, capacitors, batteries, electrodes, anodes, cathodes, photovoltaic devices, photovoltaic cells, transistors, current collectors, fuel cells, water splitting devices, and combinations thereof.

In some embodiments, the energy storage device is a battery. In some embodiments, the battery includes, without limitation, rechargeable batteries, non-rechargeable batteries, micro batteries, lithium-ion batteries, lithium-sulfur batteries, lithium-air batteries, sodium-ion batteries, sodium-sulfur batteries, sodium-air batteries, magnesium-ion batteries, magnesium-sulfur batteries, magnesium-air batteries, aluminum-ion batteries, aluminum-sulfur batteries, aluminum-air batteries, calcium-ion batteries, calcium-sulfur batteries, calcium-air batteries, zinc-ion batteries, zinc-sulfur batteries, zinc-air batteries, and combinations thereof. In some embodiments, the energy storage device is a lithium-ion battery.

In some embodiments, the energy storage device is a capacitor. In some embodiments, the capacitor includes, without limitation, supercapacitors, microcapacitors, pseudocapacitors, lithium-ion capacitors, and combinations thereof. In some embodiments, the capacitor is a lithium-ion capacitor.

The carbon nanotube hybrid materials of the present disclosure can be utilized as various components of energy storage devices. For instance, in some embodiments, the carbon nanotube hybrid materials of the present disclosure are utilized as an electrode in an energy storage device.

In some embodiments, the carbon nanotube hybrid materials of the present disclosure are utilized as a cathode in an energy storage device. In some embodiments, the cathode has a capacity of at least about 100 mAh/g.

In some embodiments, the carbon nanotube hybrid materials of the present disclosure are utilized as an anode in an energy storage device. In some embodiments, the anode has a capacity of at least about 500 mAh/g. In some embodiments, the anode has a capacity of at least about 1,000 mAh/g. In some embodiments, the anode has a capacity of at least about 1,200 mAh/g. In some embodiments, the anode has a capacity of at least about 1,250 mAh/g.

In some embodiments, the carbon nanotube hybrid materials of the present disclosure are utilized as a cathode and an anode in an energy storage device. In some embodiments, the carbon nanotube hybrid materials of the present disclosure are utilized as cathodes or anodes in batteries (e.g., lithium-ion batteries). In some embodiments, the carbon nanotube hybrid materials of the present disclosure are utilized as cathodes or anodes in capacitors (e.g., lithium-ion capacitors). In more specific embodiments, the carbon nanotube hybrid materials of the present disclosure are utilized as a cathode and an anode in lithium-ion capacitors.

In some embodiments, the carbon nanotube hybrid materials of the present disclosure provide a continuous electrical path to a current collector when they are utilized as an electrode. As such, no additional contact resistance with the carbon-based material is expected, which is important for high rate performances. In some embodiments, the carbon nanotube hybrid materials of the present disclosure correspond to 100% of the mass of the active electrode material.

Advantages

The methods, catalyst solutions and carbon nanotube hybrid materials of the present disclosure can provide numerous advantages. In particular, due to their liquid-based nature, the catalyst solutions of the present disclosure can be deposited on any desired carbon morphologies with different architectures. The deposited catalysts can then be utilized to scale up the growth of carbon nanotube hybrid materials to large areas. As such, the present disclosure can be utilized to form three-dimensional carbon nanotube hybrid materials on non-planar, flexible, and amorphous surfaces in a scalable manner.

Furthermore, the catalyst solutions of the present disclosure provide an "all in one" catalyst that combines the metal component and the buffer component in a single solution. This in turn has the added benefit of condensing the catalyst coating processes to a single step without requiring sophisticated and multi-step deposition processes, such as two-step e-beam deposition of a catalyst and a buffer under high vacuum conditions.

Moreover, the catalyst solution components are affordable and readily available. In addition, the solution-based nature of the catalysts of the present disclosure allows users to easily manipulate the catalyst components and use coating processes that are industry favored.

The carbon nanotube hybrid materials that are formed by the methods of the present disclosure can also have various advantageous properties. For instance, the energy storage devices that contain the carbon nanotube hybrid materials of the present disclosure can have high energy densities of at least about 100 Wh/kg (e.g., about 120 Wh/kg). In some embodiments, the energy storage devices have power density capabilities of at least about 10,000 W/kg, or at least about 20,000 W/kg (e.g., about 20,500 W/kg at 29 Wh/kg). In some embodiments, the energy storage devices have high voltage operations of at least about 3 V (e.g., at least about 4 V). In some embodiments, the energy storage devices have capacity retentions of at least about 85%, at least about 90%, or at least about 95% after more than 10,000 cycles.

ADDITIONAL EMBODIMENTS

Reference will now be made to more specific embodiments of the present disclosure and experimental results that provide support for such embodiments. However, Applicants note that the disclosure herein is for illustrative purposes only and is not intended to limit the scope of the claimed subject matter in any way.

Example 1. Graphene Carbon Nanotube Carpets Grown Using Binary Catalysts for High-Performance Lithium Ion Capacitors In this Example, Applicants show that a versatile binary catalyst solution of $Fe_3O_4/AlO_x$ nanoparticles enables homogeneous growth of single to few-walled carbon nanotube carpets from both two-dimensional (2D) and three-dimensional (3D) carbon-based substrates, forming seamless junctions between graphene and carbon nanotubes (GCNT). The binary catalyst was composed of crystalline and amorphous nanoparticles resulting in a homogeneous distribution of $AlO_x$ over $Fe_3O_4$ nanoparticles to grow high density CNT carpets. The catalyst solution enables CNT growth over the entire surface of 3D substrates, unlike catalyst evaporation methods that are limited to 2D substrates. As a demonstration of the utility of this approach, GCNT structures, when used as anodes and cathodes in binder-free lithium ion capacitors, produce stable devices with high energy density (~120 Wh $kg^{-1}$), large voltage operation (4.3 to 0.01 V) and high power density capabilities (~20500 W $kg^{-1}$ at 29 Wh $kg^{-1}$), with this high performance attributed to the ohmic contact between the CNTs and the underlying graphene substrate.

In this Example, Applicants also report the synthesis of the aforementioned binary catalyst. Because of the liquid nature of this catalyst, the production of GCNT is scalable and not limited to planar geometries as in the standard e-beam evaporation method. The composition of the catalyst, $Fe_3O_4$ NPs with an amorphous $AlO_x$ NP layer, enables the growth of single walled CNT (SWCNT) to few-walled CNT (FWCNT) carpets from various carbon substrates, such as graphene on Cu substrates (G-Cu), bulk carbon fiber (CF) papers and graphene nanoribbon (GNR) papers prepared by filtration.

Applicants also investigated the effect of synthetic methods, $AlO_x$ content, and catalyst content on the density of the resulting GCNT carpets. The GCNT carpets could not be formed by the successive deposition of $Fe_3O_4$ NPs followed by deposition of $AlO_x$. Thus, only by the dual $Fe_3O_4/AlO_x$ deposition could the GCNT carpets be formed.

The GCNT carpets produced on different substrates were used directly as anodes and cathodes in binder-free lithium ion capacitors (LICs). Higher lithium ion capacities were obtained at both anodes (~1250 mAh $g^{-1}$) and cathodes (~100 mAh $g^{-1}$), enabling LICs with high energy density (~120 Wh $kg^{-1}$) and high voltage operation (4.3 to 0.01 V). Due to the seamless connection of the graphene and the CNT carpets, these devices also displayed exceedingly high power capabilities (~20500 W $kg^{-1}$ at 29 Wh $kg^{-1}$), making them suitable candidates for energy storage devices with ultra-fast charging properties.

Figure 2A:
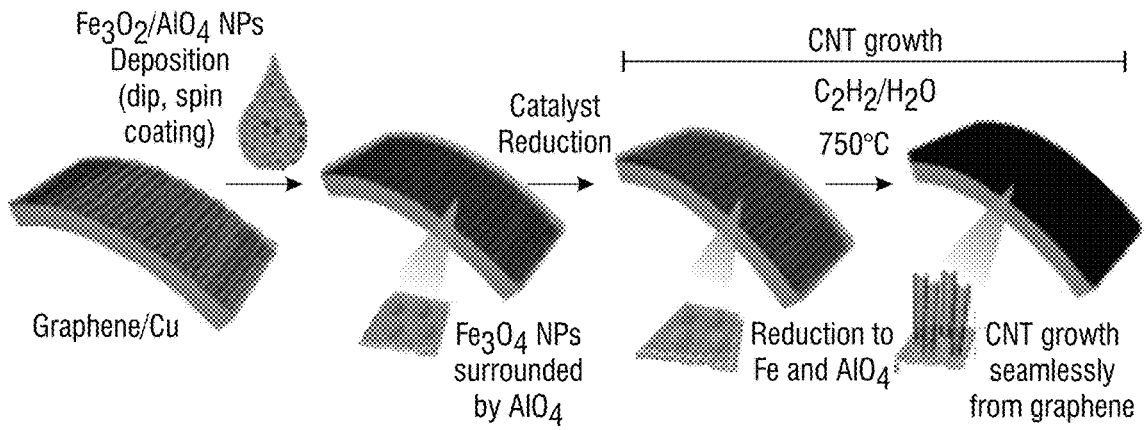

FIG. 2A is a scheme illustrating GCNT growth using the $Fe_3O_4/AlO_x$ binary catalyst that was spin or dip coated onto a G-Cu substrate. The catalyst coated substrate was then introduced into the CNT growth chamber, and exposed to high temperatures (750° C.) and atomic hydrogen conditions that activated the catalyst and converted the $Fe_3O_4$ and $AlO_x$ NPs into metallic Fe and $Al_2O_3$ layers, respectively. This binary composition enabled growth of the seamless structure of CNTs from the original graphene layer via a tip-growth mechanism.

The binary catalyst was prepared by using a colloidal method in benzyl ether at 200° C. from an optimized molar ratio of iron(III) and Al(III) acetylacetonate ($Fe(acac)_3$ and $Al(acac)_3$). Oleic acid was added as a passivation agent to prevent NP aggregation and also conferred solubility to the NPs in non-polar solvents such as hexane. As shown in the transmission electron microscopy (TEM) image in FIG. 2B, the size of the $Fe_3O_4$ NPs ranged from 4 to 10 nm. The small angle X-ray scattering (SAXS) measurements show an average size of 7.3 nm with a 30% size dispersion (FIG. 3). The size of the $Fe_3O_4$ NPs can be adjusted by changing the reflux time during synthesis, allowing for control of the GCNT properties. The presence of Al and Fe in the binary catalyst was verified by elemental mapping of the TEM image (FIG. 2C) and by the energy dispersive spectrum (EDS) shown in FIG. 2D.

Figure 2B:
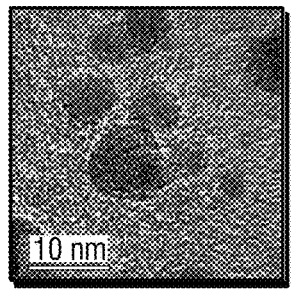
Figure 2C:
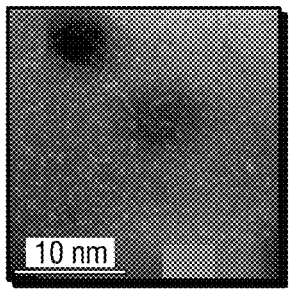
Figure 2D:
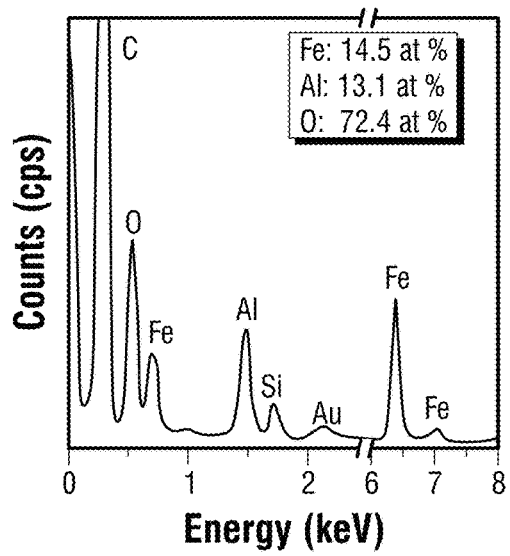
Figure 3:
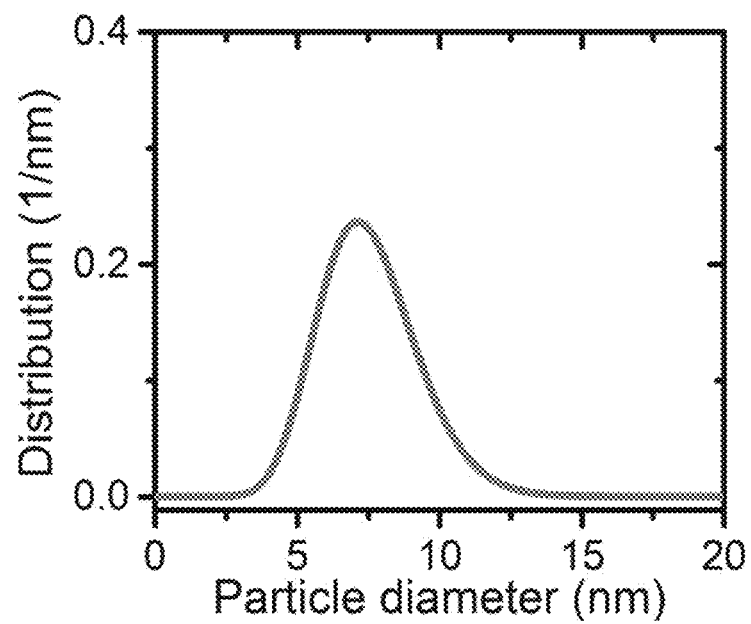

In FIGS. 2B-D, a 1:1 molar ratio of $Fe(acac)_3$ and $Al(acac)_3$ was used to produce the NPs. The elemental map shows a clear separation of the elements, with Fe location restricted within the $Fe_3O_4/AlO_x$ NPs, whereas the Al was evenly distributed over the $Fe_3O_4/AlO_x$ NPs. No Al aggregates were found, indicating that the Al could be present as ultra-small $AlO_x$ NPs surrounding the $Fe_3O_4$ NPs. The role of Al was to hinder Ostwald ripening of small Fe particles under CNT-growth conditions because the Al—O bonds are much more stable than Fe—O bonds (Al—O at 450 kJ $mol^{-1}$; Fe—O at 210 kJ $mol^{-1}$).

Without being bound by theory, it is envisioned that the binary catalyst solution application method was more versatile than the evaporation method because it wets the inner surface of carbon substrates such as CF and GNR. This in turn produces multiple junctions of CNTs within these structures.

Figure 2E:
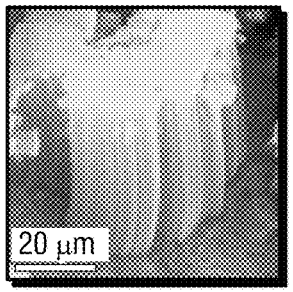
Figure 2F:
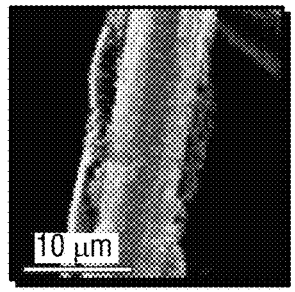
Figure 2G:
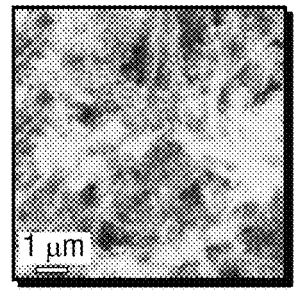

FIG. 2E shows a scanning electron microscope (SEM) image of a dense forest of GCNT carpets produced from a G-Cu substrate. FIGS. 2F-G show similar SEM images of GCNT carpets grown on CF and GNR substrates, respectively. The difference in composition of the GCNTs is due to the method of deposition and the different surface area of G-Cu when compared to CF or GNR substrates. For these substrates, catalyst deposition can be easily achieved using methods such as dip-coating (best for CF and GNR) or spin-coating (best for G-Cu). The catalyst was dried at 70° C. in air at 1 atm before CVD growth.

Figure 4A:
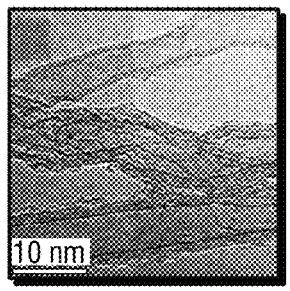
Figure 4B:
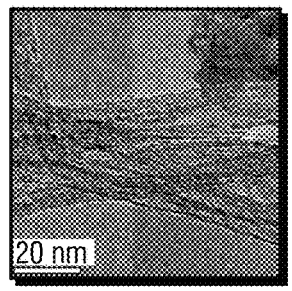
Figure 4C:
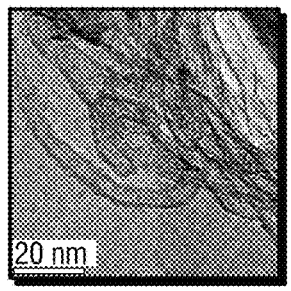

The TEM images of FIGS. 4A-C show that the structure of CNTs are similar and independent of the NP deposition methods or the starting $sp^2$ carbon substrate. The CNTs were mainly FWCNT with an average diameter of 4 to 10 nm due to the size of the $Fe_3O_4$ NPs.

Figure 4D:
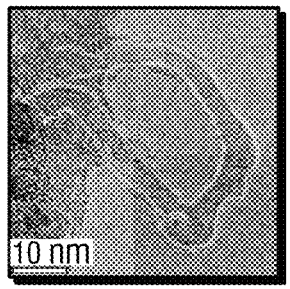
Figure 4E:
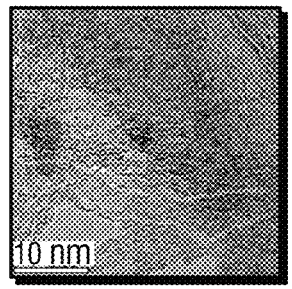
Figure 4F:
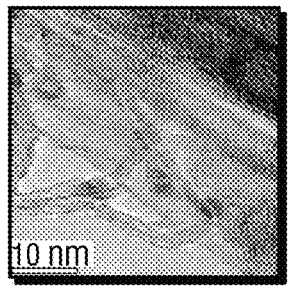

FIGS. 4D-F show TEM images of several CNTs (highlighted) emanating from the GNRs. In some cases, it was possible to directly observe spots in which the CNTs merge with the basal plane of the graphene. Additionally, the $Fe_3O_4$ NPs were not directly located at the point of merger, supporting the tip-growth mechanism in which the $Fe_3O_4$ NPs rest at the CNT tip, far from the graphene plane.

Figure 4G:
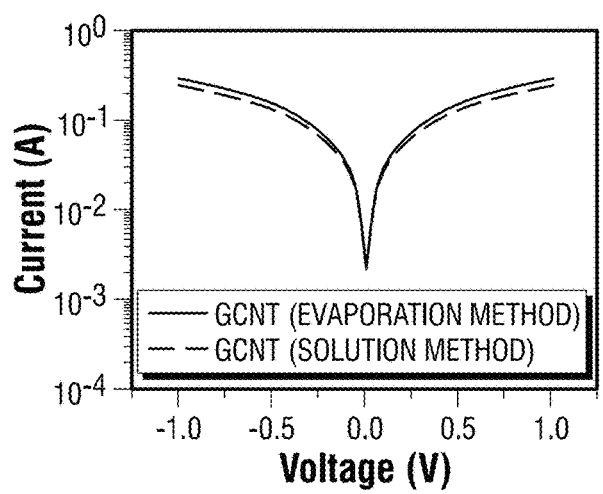
Figure 5:
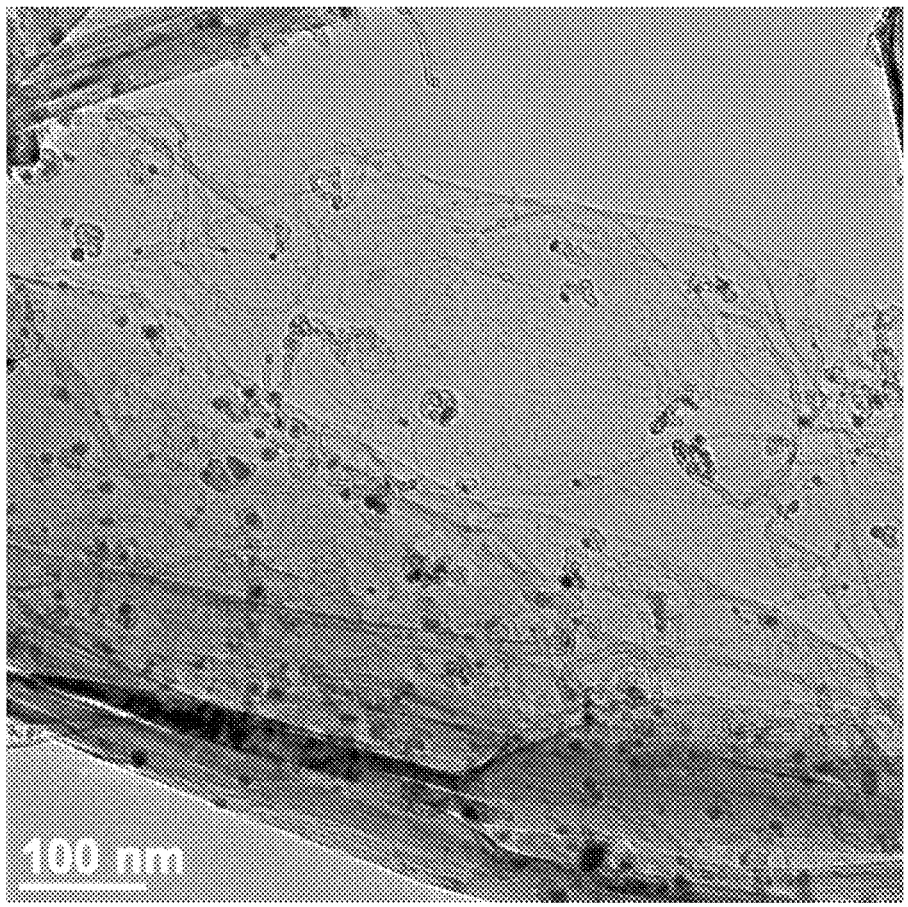

Further lower magnification images show the NPs at the tube ends (FIG. 5). The seamless connection in GCNTs grown by the evaporation method was verified by current versus voltage curves measured between the copper foil and the CNT tips. These experiments were repeated to compare the conductivity across the CNT carpet produced by the binary catalyst solution versus the e-beam evaporation method (1 nm Fe and 3 nm $Al_2O_3$ over G-Cu substrate). As shown in FIG. 4G, the current levels in the GCNT grown from the $Fe_3O_4/AlO_x$ binary catalyst are comparable with the current levels in the GCNTs from the evaporation method.

Figure 4H:
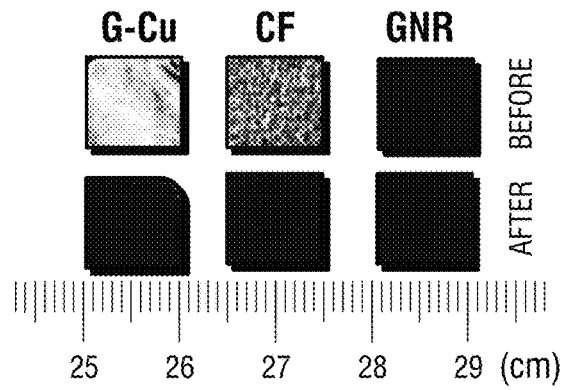

FIG. 4H shows photographs of G-Cu, CF and GNR papers, before and after CNT growth. The GNRs were synthesized by reductive longitudinal unzipping of MWCNTs, as reported elsewhere. See, e.g., U.S. Pat. Nos. 9,493,355 and 8,992,881.

Figure 6A:
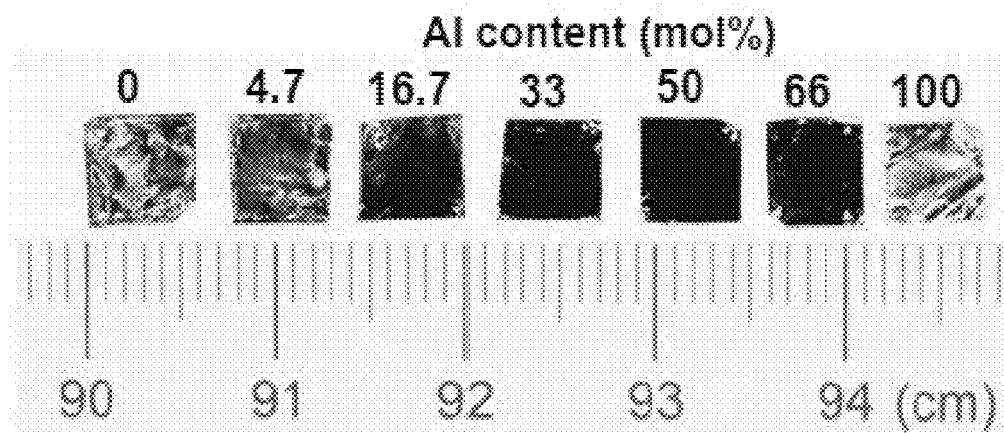
Figure 6B:
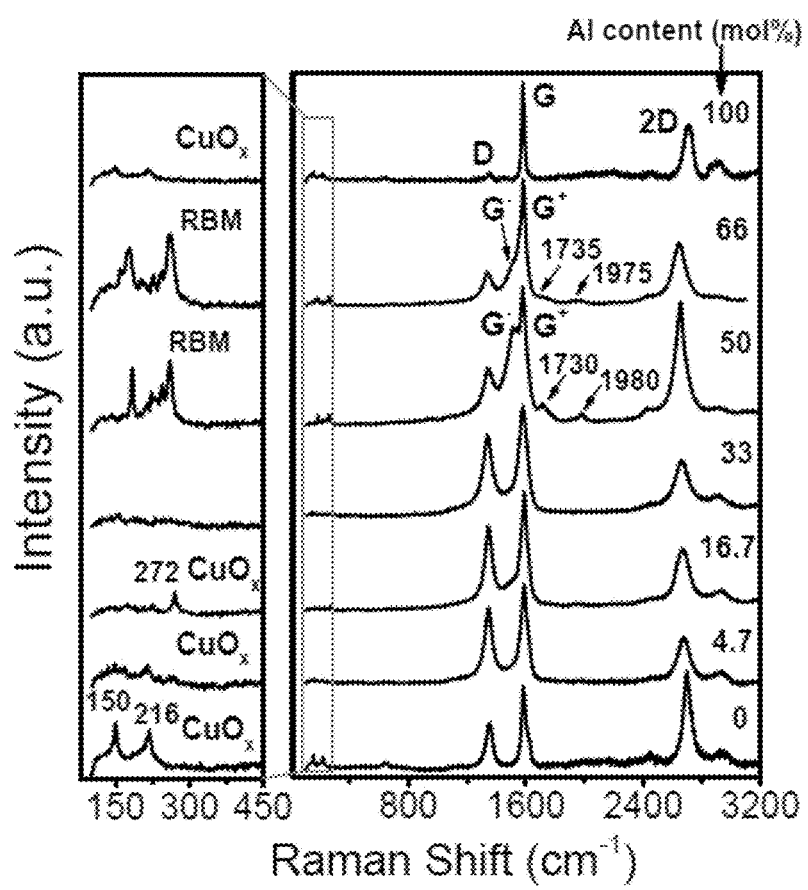

In order to produce GCNTs that have features similar to the materials produced using evaporation methods, the proportion of Al to Fe in the $Fe_3O_4/AlO_x$ binary catalyst was optimized. FIG. 6A shows a photograph in which CNTs were grown on the G-Cu substrate while the Al content was varied during the synthesis. The labels in FIGS. 6A-6B represent the proportion of Al over the total amount of metal (Al+Fe) in moles. Solutions of catalysts containing only $AlO_x$ or only $Fe_3O_4$ NPs are represented by 0 and 100 mol %, respectively. The binary compositions are represented by 4.7, 16.7, 33, 50 and 66 mol % Al, which corresponds to Al:Fe molar ratios of 0.05:1, 0.2:1, 0.5:1, 1:1 and 2:1, respectively.

The photograph in FIG. 6A shows that increasing the Al content in the catalyst solution results in the formation of a dense carpet on the G-Cu substrate. No carpets were observed using only $AlO_x$ or only $Fe_3O_4$ NPs (0 or 100 mol %), showing the importance of the binary composition. Applicants found that an optimal proportion of 50 mol % Al (molar ratio Al:Fe 1:1) produced a completely dense carpet of CNTs covering the entire G-Cu substrate whereas using a 33 mol % Al catalyst produced an incomplete yet dense CNT carpet. CNTs grown using catalysts with less than 33 mol % Al produced sparse carpets. This analysis is corroborated by SEM images of the G-Cu substrate after CNT growth using the different Al content catalyst solutions (FIG. 7). Furthermore, Raman spectroscopy (FIG. 6B) was used to verify the structure of the produced CNTs.

Raman spectra of the grown CNTs (FIG. 6B) showed characteristic features of sp$^2$ carbon nanomaterials, such as the D, G and 2D bands. The G band arises from the stretching of C—C bonds. The D band is activated by disordered structure in graphene, while the 2D band is the result of the second order process of the D band requiring no defect activation. These modes are present in the spectra of all samples.

In the spectra of CNTs produced with $Fe_3O_4/AlO_x$ binary catalysts with less than 33 mol % Al, the Raman spectra present well defined D, G and 2D bands. In these samples, the CNTs produced are MWCNTs distributed non-homogenously over the G-Cu substrates (FIGS. 7A-7G). Additional modes of low intensity are also found in the 80 to 450 cm$^{-1}$ wave number region at 150, 216 and 272 cm$^{-1}$ (inset of FIG. 6B). These peak intensities resemble the peak intensities for $CuO_x$ species, such as $Cu_2O$ and CuO.

When the Al content is over 50 mol % (spectra of 50 and 66 mol % Al, FIG. 6B), a different spectrum is observed. The G band splits into G$^+$ and G$^-$ bands, characteristic of SWCNTs to FWCNTs. The splitting is the result of the large curvature of SWCNTs, causing the C—C vibrations along the axis of the tube (G$^+$) to have a different energy than those along the circumference (G$^-$).

As shown in the inset of FIG. 6B, the radial breathing modes (RBMs, the synchronous movement of carbon atoms in the radial direction) are also detected in the spectra of the samples produced using catalysts with 50 and 66 mol % Al. These modes are also a fingerprint of the existence of small diameter SWCNTs and FWCNTs produced from the underlying G-Cu substrate using the $Fe_3O_4/AlO_x$ binary catalyst. The modes at ~1735 and 1980 cm$^{-1}$ are also characteristic of this type of CNT.

In the spectrum of the sample produced using only $AlO_x$ NPs, the observed modes correspond to the pure underlying graphene, indicating that no CNTs were produced over it. Therefore, the Raman spectra (FIG. 6B) and the observation regarding the GCNT density (FIGS. 6A and 7A-7G) indicate that a minimum of 50 mol % Al content in the $Fe_3O_4/AlO_x$ binary catalyst is necessary in this Example to produce denser CNT carpets. In the remainder of this Example, only data from the 50 mol % $Fe_3O_4/AlO_x$ binary catalyst will be presented, unless otherwise stated.

Figures 8, 8A, 8B:
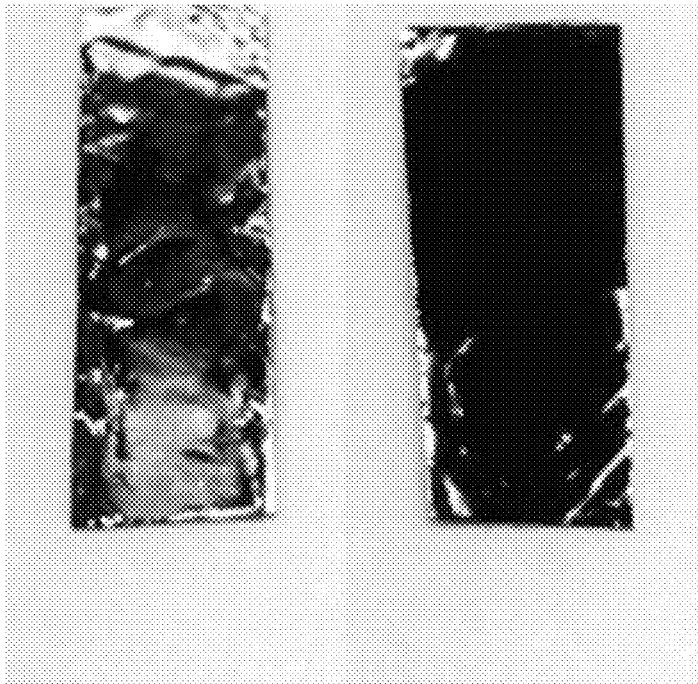

Additional evidence for the importance of the binary composition is that the same GCNT carpets produced with $Fe_3O_4/AlO_x$ binary catalyst could not be reproduced using the sequential or combined deposition of solutions containing only $Fe_3O_4$ and only $AlO_x$ NPs. In a control experiment (FIG. 8), the catalyst produced by spin coating $Fe_3O_4$ NPs over a G-Cu substrate followed by an additional spin coating of $AlO_x$ NPs (dual deposition) did not produce GCNT carpets as dense as the samples produced using the $Fe_3O_4/AlO_x$ binary catalyst (FIG. 8).

Applicants also performed infrared (IR) analysis of the $Fe_3O_4$, $AlO_x$ and $Fe_3O_4/AlO_x$ binary catalysts (FIG. 9A). The IR spectra were used to characterize the organic passivant layer, composed of oleic acid. The wavenumber of the carboxylate stretching (COO$^-$) modes of oleic acid ($v_{asym}$, $v_{sym}$), as well as their difference ($\Delta_{exp}=v_{asym}-v_{sym}$), has been used to determine the mode of the COO$^-$ binding on metal surfaces. The IR spectrum of $Fe_3O_4$ NPs (FIG. 9A) shows that oleic acid is present on the surface of the NPs as evidenced by the symmetric ($v_{sym}$) and antisymmetric ($v_{asym}$) CH$_2$ stretches at 2848 and 2917 cm$^{-1}$, respectively, as well as the COO$^-$ modes at 1405 cm$^{-1}$ ($v_{sym}$) and 1527 cm$^{-1}$ ($v_{asym}$). There were no C=O stretches (~1710 cm$^{-1}$) in the IR spectrum of the $Fe_3O_4$ NPs alone, indicating that all the oleic acid molecules were bound to the surface of the NPs.

The IR spectrum of the $AlO_x$ NPs (FIG. 9A) indicated similar modes but with a significant shift in the $v_{sym}$ and $v_{asym}$ modes of the COO$^-$ to 1462 and 1571 cm$^{-1}$, respectively. The values of $v_{asym}$ and $v_{sym}$ are consistent with $Al_2O_3$NPs passivated with oleic acid. Compared to the values found in $Fe_3O_4$ NPs, the large shift of COO$^-$ stretching modes to higher wavenumber indicates weak ionic bonding between the $AlO_x$ surface and the COO$^-$ moiety of the oleic acids. In contrast, a strong covalent bond dominates the $Fe_3O_4$ NPs. These differences in bond strength can be directly related to the Lewis basicity of these metal oxides and their ionic radii ($Al^{3+}$ 0.4 Å; $Fe^{2+}/Fe^{3+}$ 0.76 Å/0.64 Å; $O^{2-}$ 1.32 Å). The small ($\Delta_{exp}=108$ cm$^{-1}$) ionic bonding in $AlO_x$ can be attributed to a less ordered COO$^-$ bonding over the surface of $AlO_x$ NPs.

In the spectrum of the $Fe_3O_4/AlO_x$ binary catalyst (FIG. 9A), the COO$^-$ modes are measured over the mixture of $Fe_3O_4$ and $AlO_x$ NPs. The values of COO$^-$ $v_{asym}$ and $v_{sym}$ are about 1430 and about 1560 cm$^{-1}$, respectively ($\Delta_{exp}=130$ cm$^{-1}$). An additional C=O stretch band is observed at 1710 cm$^{-1}$, indicating the presence of free oleic acid in the binary catalyst, in contrast to the spectra of $Fe_3O_4$ or $AlO_x$ only.

Figure 10:
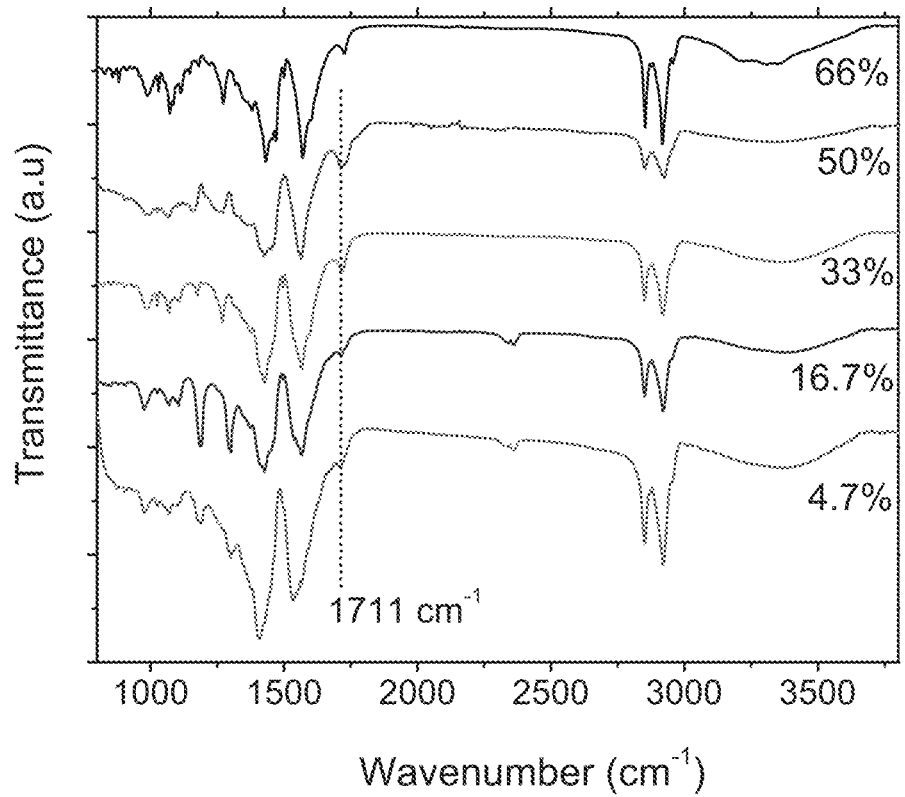

FIG. 10 shows the IR spectra of all binary catalysts (4.7 to 66 mol % Al) displaying the same 1710 cm$^{-1}$ mode. As discussed before, the $Fe_3O_4$ surface displays strong oleic acid bonding, while $AlO_x$ shows weak and disorganized bonding. Therefore, the passivant layer of the latter could be shared with the $Fe_3O_4$ surface, leading to a partial release of oleic acids and the production of a stable shell of $AlO_x$ over the $Fe_3O_4$ NPs. This is further supported by the higher wavenumber of the —CH$_2$— stretching modes of 2852 and 2922 cm$^{-1}$ in the $Fe_3O_4/AlO_x$ binary catalyst when compared to 2848 and 2917 cm$^{-1}$ for the catalyst with only $Fe_3O_4$ NPs. Higher wavenumbers are characteristic of disorganized or less packed oleic acid layers, in this case shared between $Fe_3O_4$ and $AlO_x$.

Figure 11A:
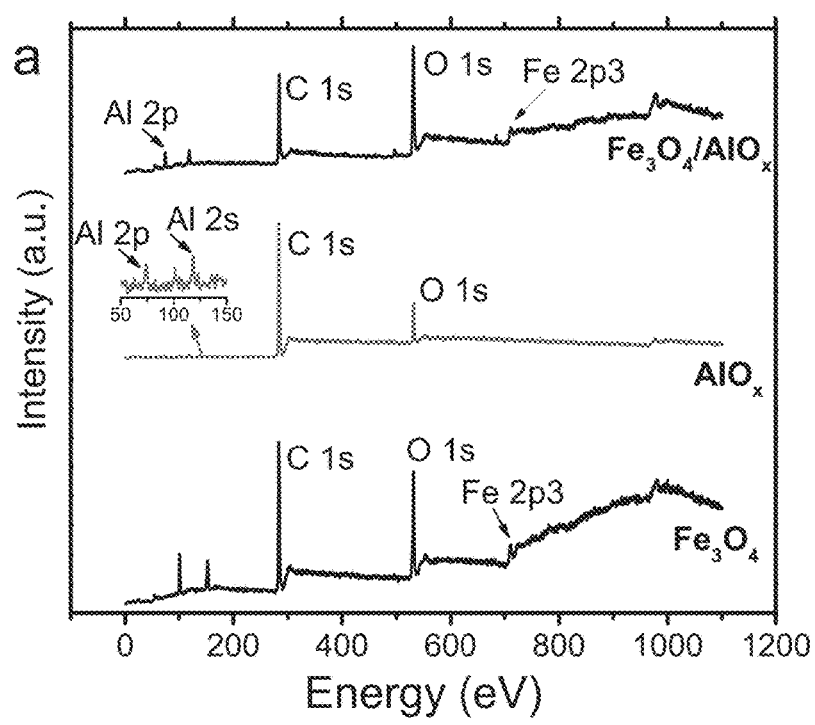
Figure 11B:
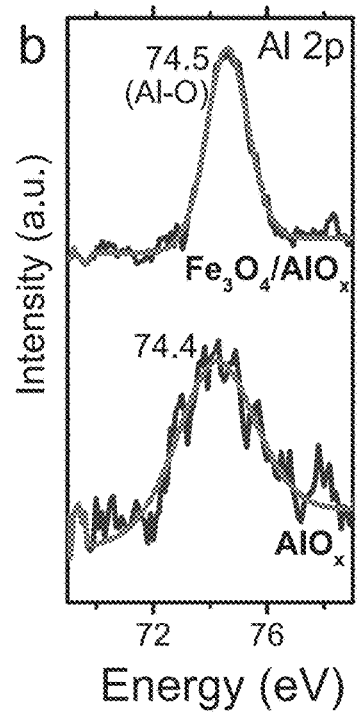

The X-ray photoelectron spectroscopy (XPS) data in FIGS. 9B-C support the release of oleic acid by the interaction of $Fe_3O_4$ and $AlO_x$. The complete survey XPS spectra of $AlO_x$, $Fe_3O_4$ and $Fe_3O_4/AlO_x$ are shown in FIG. 11A. The C 1s spectra display an enhanced 285.6 eV peak intensity in the binary catalyst, attributed to the CH$_2$ groups linked to a carboxyl group, while the peak at 284.7 eV can be attributed to CH$_2$ groups. A similar result is also observed in the O 1s XPS spectra, with an enhanced 533.6 eV peak intensity, attributed to the metal coordinated carboxylate. The Al 2p spectrum is presented in FIG. 11B, showing the Al—O bond at 74.5 eV in $AlO_x$ NPs.

The XRD patterns of $AlO_x$, $Fe_3O_4$ and the $Fe_3O_4/AlO_x$ binary catalyst are shown in FIG. 9D. The expected crystalline $Fe_3O_4$ peaks are found in the XRD patterns of the $Fe_3O_4$ NPs and the $Fe_3O_4/AlO_x$ binary catalyst. The XRD pattern of $AlO_x$ shows amorphous material in both the $AlO_x$ and $Fe_3O_4/AlO_x$ samples with a broad halo peak centered at approximately 21°. No evidence of remaining $Al(acac)_3$ was observed. The powder diffraction file (PDF) of $Al(acac)_3$ is provided in FIG. 9D for comparison. The amorphous nature of $AlO_x$ supports the disorganization of COO$^-$ bonding as indicated by the IR analysis since no well-defined $AlO_x$ surface is available for bonding.

This was also previously demonstrated in the TEM images, in which no discrete particles of $AlO_x$ were found in the $AlO_x$ sample, although the Al presence was detected by EDS mapping. This leads Applicants to conclude that $AlO_x$ is composed of small molecular clusters $(AlO_x)_n$ functionalized by oleic acid. The formation of these small $AlO_x$ NPs is important for the homogeneous distribution of Al over the $Fe_3O_4$ NPs and it explains the performance of the $Fe_3O_4$/$AlO_x$ binary catalyst.

The production of crystalline $Fe_3O_4$ and amorphous $AlO_x$ in the $Fe_3O_4$/$AlO_x$ binary catalyst can be explained by examining the synthesis conditions. The temperature of the synthesis (200° C.) is above the decomposition temperature of the $Fe(acac)_3$ (>170° C.), but not the $Al(acac)_3$ (>230° C.). As such, oleic acid functionalized $AlO_x$ clusters are formed.

Figure 9F:
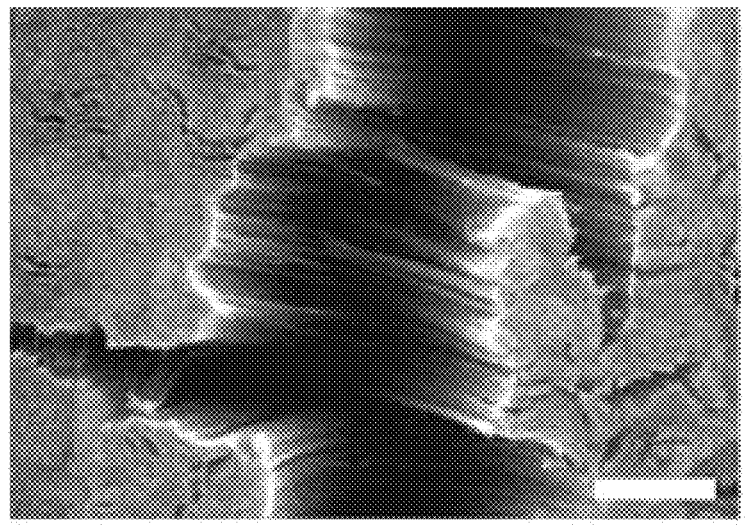
Figure 9G:
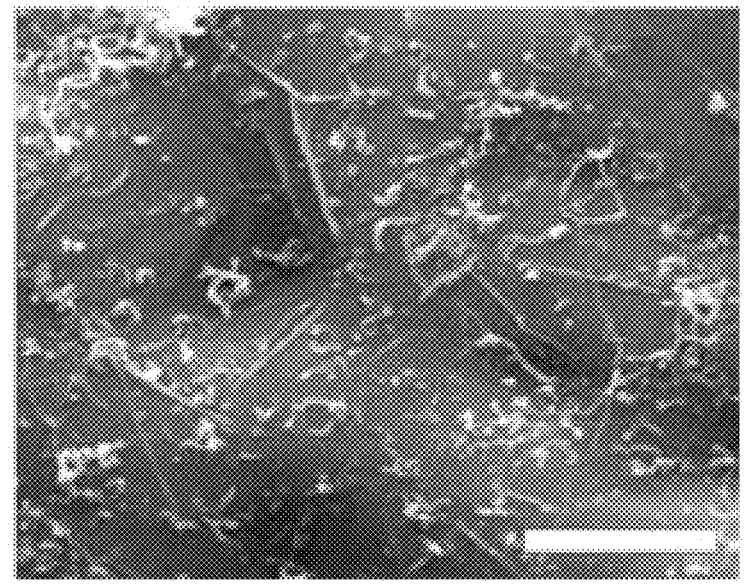

At 280° C., the $Al(acac)_3$ decomposes, leading to byproducts that are washed away during the work-up process. This is shown in FIG. 9E, which compares the Al, Fe and C content, measured by EDS in the $Fe_3O_4$/$AlO_x$ binary catalysts produced at 200 and 280° C. The synthesis at lower temperature enables almost complete conversion of $Al(acac)_3$ to oleic acid functionalized $AlO_x$ NPs, while the synthesis at 280° C. decreases the Al content by 40% in the $Fe_3O_4$/$AlO_x$ binary catalyst. The result is a much denser GCNT carpet using the lower temperature catalyst formation process (FIG. 9F) compared with the sparse tubes obtained with the high temperature-made catalyst (FIG. 9G), due to insufficient Al content in the latter.

The interaction of $AlO_x$ and $Fe_3O_4$ NPs is important to explain the performance of the binary catalyst compared to the separate materials. During synthesis, the nucleation of $Fe_3O_4$ NPs occurs before or during the conversion of $Al(acac)_3$ to $AlO_x$ NPs, thereby improving the sharing of the oleic acid passivant as supported by the IR analysis. Applicants assume that this leads to a more homogeneous distribution of particles.

As discussed, the $AlO_x$ should cover the $Fe_3O_4$ NPs to an extent such that the Fe particles do not coalesce during CNT growth. By remaining small, the NPs produce single to few-walled CNTs, as shown by Raman spectroscopy. The support function of $AlO_x$ is also responsible for the high density GCNT carpets. Without $AlO_x$ high content, the $Fe_3O_4$ particles can move through the substrate, thus not producing homogeneous carpets of CNTs.

In addition, the highly homogeneous distribution of $AlO_x$ over the $Fe_3O_4$ NPs indicates that the $AlO_x$ layer could be formed on both top and bottom parts of the $Fe_3O_4$ NP layer, after the spin or dip-coating deposition. These configurations can lead to both CNT base or tip-growth mechanisms.

In particular, the current versus voltage measurements showed comparable conductivity with the GCNTs produced using the evaporation methods, indicating that the binary catalyst follows a similar tip-growth mechanism, enabling seamless GCNT junctions. This demonstrates a synergistic effect based on the combination of crystalline and amorphous NPs and their surface reactivity toward a similar passivation layer. Therefore, the binary composition, the Al content and the synthesis conditions together explain the successful growth of the GCNT carpets using this solution-based approach.

Figure 12A:
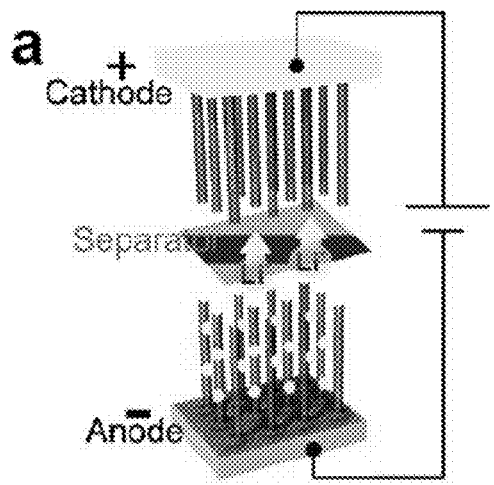

The schematic illustration in FIG. 12A shows how Applicants used GCNT carpets as both anodes and cathodes in lithium ion capacitors (LICs). These LICs have high energy densities comparable to those of lithium ion batteries (LIBs). The lithium reactions in traditional LIB electrodes are limited in power density by the slow diffusion of solid-state Li ions into the cathodes. Replacing the cathode with a capacitive electrode can overcome this limitation, thereby allowing LICs to have both the high energy densities of LIBs and the high power densities of supercapacitors.

Figure 12B:
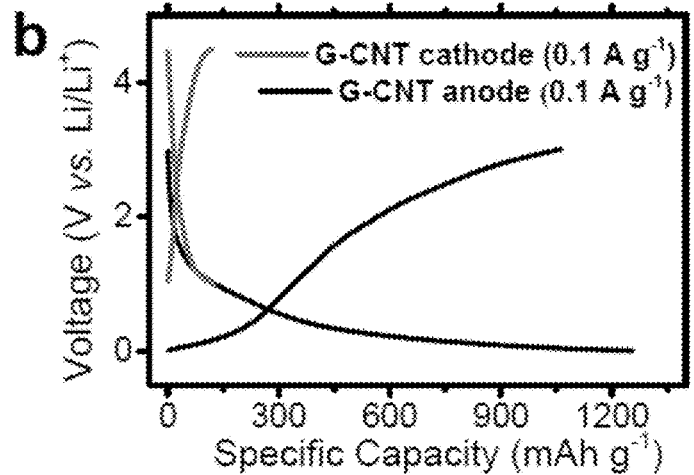

Prior to fabrication of the full cell, Li half-cells of the GCNTs were tested in order to determine the total capacity delivered for each voltage range. For cathode applications, the copper foil was either replaced by Al foil or the growth was performed on CF substrates. FIG. 12B shows the galvanostatic charge/discharge curves of the half-cells in the voltage range of 0.01 V to 3 V (anode, black line) and 1 to 4.5 V (cathode, red line). Within its specific voltage range, the cathode delivered a capacity of approximately ~100 mAh $g^{-1}$, while the anode delivered a capacity of ~1250 mAh $g^{-1}$, both tested at 0.1 A $g^{-1}$ (the $5^{th}$ cycles are represented in FIG. 12B). The discrepancy in capacity suggests a different mechanism for Li storage in these two voltage ranges. For the full LIC construction, a higher mass of cathode was used to match the capacity of the anode.

The charge/discharge profile of the anode presents an unusually high capacity for a lithiated carbon anode, higher than that expected for graphite ($LiC_6$, 372 mAh $g^{-1}$) or graphene, in which Li can be theoretically stored on both sides of the sheet, as in $LiC_3$. Most of the discharge capacity (lithiation reaction) was obtained under 0.5 V, while the charge process (dilithiation reaction) extended up to 3.0 V (FIG. 12B). This voltage profile was also observed in purified SWCNT anodes in a half-cell measurement, which drastically differs from other carbon materials (such as MWCNTs and graphite) when tested as an anode.

Without being bound by theory, it is envisioned that the origin of the high capacity arises from the bundle structure of SWCNTs and FWCNTs, since it was demonstrated that the interstitial channels of the bundles were affected by the lithiation reaction and can have an active role in Li storage. The lower capacity observed when the same material was tested as a cathode can be related to a different process of Li storage. For instance, functionalized carbon materials are normally used as cathodes in LICs since Li is stored by a redox reaction within the functional groups. Therefore, the Li storage in cathodes could be proportional to the amount of functional groups and structural defects.

Figure 13A:
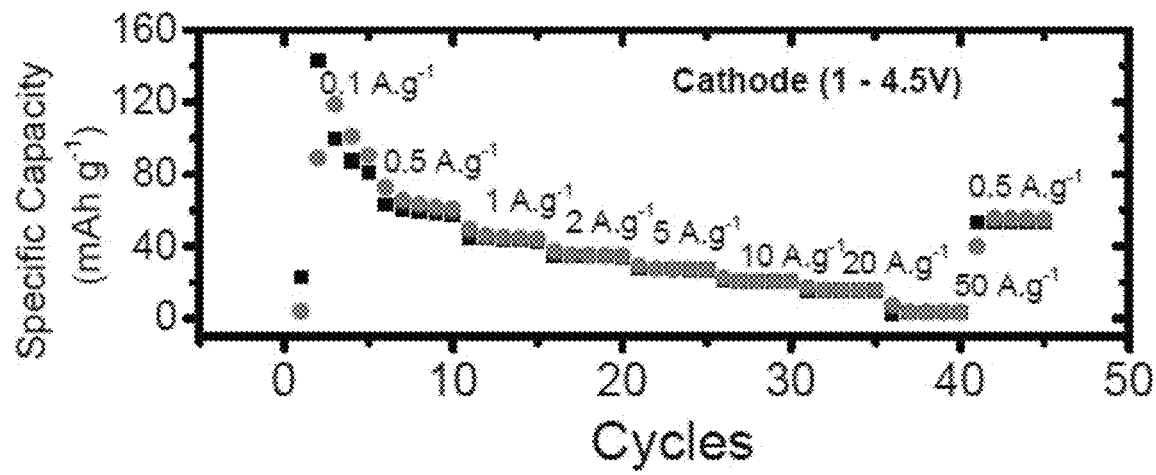
FIGS. 13A-13B show the rate testing of half-cells of GCNTs as cathodes (FIG. 13A) and anodes (FIG. 13B).
Figure 13B:
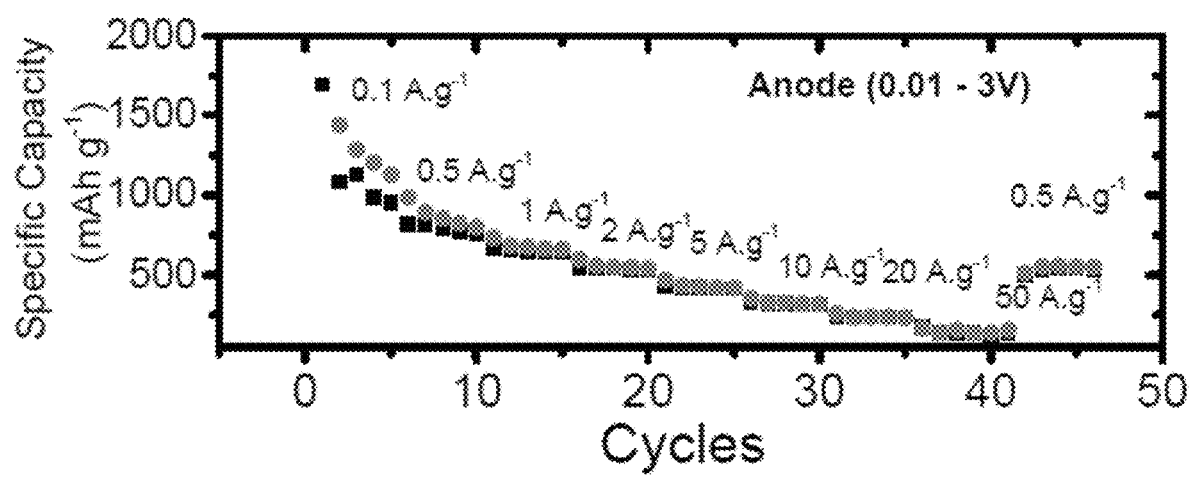

Despite the different mechanisms, the GCNT structures have a continuous electrical path to the current collector. As such, no additional contact resistance with the carbon material is expected, which is important for high rate performances. Rates from 0.1 to 50 A $g^{-1}$ were tested in both anode and cathode configurations (FIGS. 13A-13B). The GCNTs displayed optimal reversibility as a result of the seamless connection with the current collector. The similar rate performances of both electrodes (cathodes and anodes) prevent any power mismatch during the construction of the LIC.

Figure 12C:
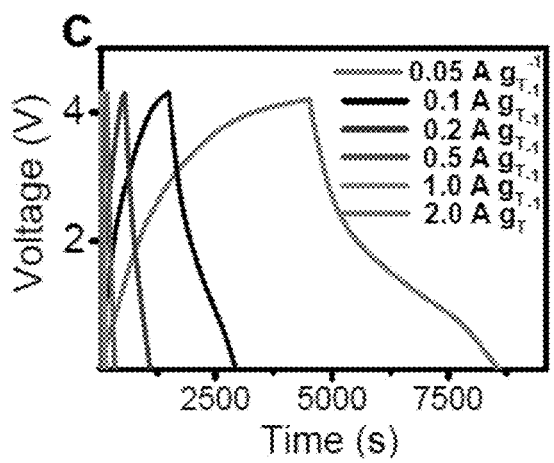
Figure 14:
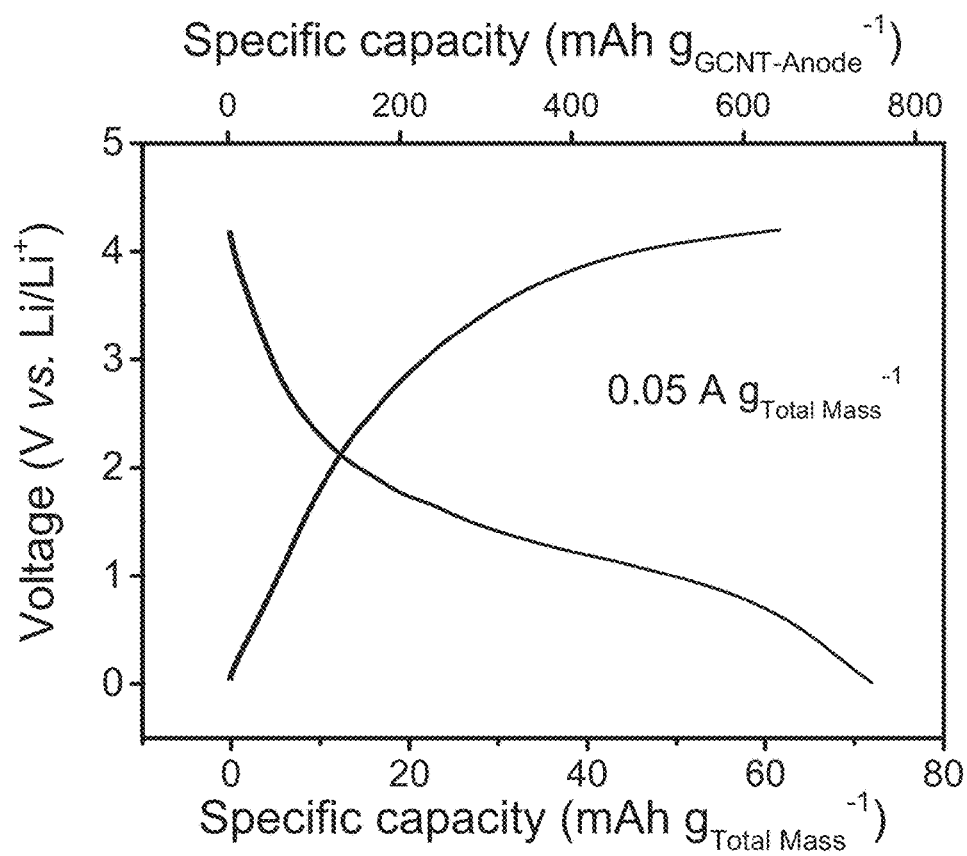
FIG. 14 shows the charge/discharge curves of the GCNT-containing LICs (GCNT LIC) (0.05 A $g^{-1}$).

The charge/discharge curves for the full capacitor (LIC) are shown in FIG. 12C, in the range of 0.01 to 4.3 V. The specific capacity achieved by the LIC was 70 mAh $g_T^{-1}$ at 0.05 A $g_T^{-1}$ ($g_T$ means that the capacity is calculated based on the total combined mass of the anode and cathode), which is equivalent to approximately 60% of utilization of the anode capacity (FIG. 14). The LIC was also tested under different rate conditions (from 0.05 A $g_T^{-1}$ to 50 A $g_T^{-1}$, FIG. 12C). The charge/discharge profiles were not significantly altered at high rates.

A slight difference was observed only in the discharge curve at very low rate testing (0.05 A $g_T^{-1}$) (FIG. 14). A feature of this LIC is that the voltage range can be interchangeably tuned to work at different ranges, as presented in FIGS. 15A-15C.

Applicants were able to operate the LIC reversibly from 0.01 to 4.3 V, 1 to 4.3 V, 2 to 4.3 V, 3 to 4.3 V and back to 0.01 V to 4.3 V without loss of capacity (FIG. 15A). Curves of charge/discharge in these different ranges are presented in FIGS. 15B-C.

Figure 12D:
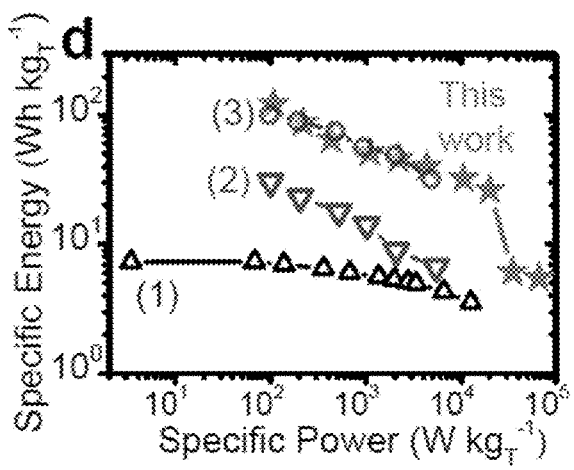

The Ragone plot was used to compare Applicants' LIC with different geometries and compositions of supercapacitors (FIG. 12D), such as symmetric carbon systems, asymmetric $MnO_2$/graphene systems, and graphene LICs. In this case, the GCNT materials corresponded to 100% of the mass of the active material, since no binder or conductive additive was used, which normally leads to the reduction of the weight percentage of the active materials to 60 to 70%, as in the other examples of FIG. 12D. At lower rates, the LIC achieves a high energy density of 121 Wh $kg_T^{-1}$, which is comparable to values found in commercial LIBs (100-220 Wh $kg_T^{-1}$). High power capabilities (~20500 W $kg_T^{-1}$) can also be obtained with moderate energy densities (~29 Wh $kg_T^{-1}$) when tested at 10 A $g_T^{-1}$, rivaling other high performance energy devices.

Tests were also conducted at higher rates (20 and 50 A $g_T^{-1}$). However, the high incremental of the voltage drop (iR drop) at the beginning of the discharge process (due to the high current density) significantly decreased the total energy density (FIG. 16). The iR drop could be caused by the limited ionic conductivity of the $Li^+$ electrolyte.

Figure 12E:
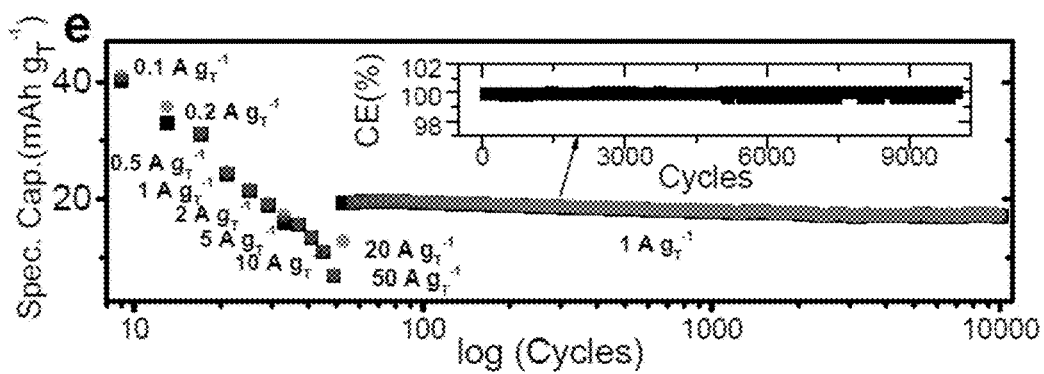

After testing under the aforementioned rates, similar capacities were recovered at 1 A $g_T^{-1}$ (FIG. 12E). In addition, the long-term stability was tested at this same rate (48 Wh $kg_T^{-1}$, 2335 W $kg_T^{-1}$) (FIG. 12E). An optimal capacity retention of 89% after more than 10,000 cycles and an average coulombic efficiency (CE) above 99.6% were observed (Inset, FIG. 12E). The self-discharge of the GCNT LIC was also tested (FIG. 17), indicating that this LIC can hold an average voltage of 3.1 V after complete charge for 20 hours, showing the robustness of the device and the stable lithiated state of the GCNT electrodes.

In summary, Applicants have shown a reliable and scalable method for the growth of GCNTs from different carbon substrates using a binary composition of $Fe_3O_4$ and $AlO_x$. The GCNT's seamless structure presents similar conductive properties as the GCNT produced by e-beam evaporation methods. The successful growth of GCNT was due to the design of the catalyst, composed of $Fe_3O_4$ NPs and $AlO_x$ clusters sharing the same organic passivation layer. This binary composition allows a homogenous coating over graphene substrate of different architectures. The resulting GCNT structure allows for a high surface area CNT carpet that is directly connected to the current collector with no observable contact resistance, making this material exceptional in terms of rate performance, as demonstrated in its capabilities as an anode and cathode in LICs.

Example 1.1. Synthesis of $Fe_3O_4/AlO_x$ Binary Catalyst

All chemicals were analytical grade and used without further purification. The synthesis of the binary catalyst was based on a modified method reported previously (*J. Am. Chem. Soc.* 2002, 124, 8204-8205). A mixture of iron(III) acetylacetonate (0.15 g), aluminum(III) acetylacetonate, 1,2-hexadecanediol (0.616 g), oleylamine (0.62 mL), and oleic acid (0.45 mL) was heated to reflux at 200° C. or 280° C. for 20 minutes in benzyl ether (20 mL) under magnetic stirring (500 RPM). The masses of $Al(acac)_3$ to prepare different Al:Fe ratio ranged from 0.01 to 0.28 g. All the other reagents remained the same.

Control experiments were performed with synthesis with only $Fe(acac)_3$ or $Al(acac)_3$. In the second case, the mass of $Al(acac)_3$ was set to 0.15 g. After the system was cooled to room temperature (RT), the NPs were precipitated by adding methanol. Next, the mixture was centrifuged at 4000 RPM for 6 minutes. The procedure was repeated three times, the supernatant was then decanted, and the NPs were dispersed in hexane with no additional oleic acid added. The total mass of the NPs were dispersed in 10 or 20 mL of hexane. In order to assist the dispersion formation, bath sonication was employed. The calculated concentration of the dispersion was 0.4 to 2 mg $mL^{-1}$.

Example 1.2. Growth of GCNTs

GCNTs were grown from CVD-deposited graphene on copper foil (G-Cu foil), graphene nanoribbons (GNR), and carbon fiber (CF). The G-Cu foil was grown based on Applicants' previously published methods (*ACS Nano* 2012, 6, 9790-9796). The GNRs and CF were purchased from Merck EMD and FuelCellsEtc Inc., respectively.

The deposition of the $Fe_3O_4/AlO_x$ binary catalyst was performed by spin coating over G-Cu substrate. A volume of catalyst, typically 100 µL per $cm^2$ of substrate or enough to cover all the surface, was deposited and spin-coated at 1000 rotations per minute (rpm). The dip coating method was also used in the GNR paper (5 mg) prepared by filtration of the CF paper.

The substrates were immersed into the solution for 20 seconds and then removed. A hot plate at 70° C. was used to dry the substrate with the catalyst solution at room temperature. The GCNT growth was based on a water assisted hot filament CVD process. The protocol started with the catalyst activation, using 30 seconds of atomic hydrogen reduction by hot filament (W wire, 30 W). The entire process was conducted at 750° C. under the flow of $C_2H_2$ (2 sccm), $H_2$ (400 sccm) and $H_2O$ vapor flow by $H_2$ gas bubbling (2 sccm). During catalyst activation, the total pressure of the furnace was held at 25 to 26 Torr. At the end of the 30 second activation process, the pressure was reduced immediately to 8.5 Torr and the growth process extended for 15 minutes at that pressure. Control experiments were done with e-beam evaporation of 1 nm of Fe followed by 3 nm of $Al_2O_3$ over G-Cu substrate.

Example 1.3. Electrochemical Tests

Electrodes were prepared without any modification after the CNT growth process. The mass of electrodes grown on G-Cu foil ranged from 0.1 to 0.3 mg $cm^{-2}$. To test as cathodes, the GCNT was removed from copper and deposited over Al foil. Alternatively, GCNTs were also grown from CF paper, with a mass loading of 1 to 2 mg $cm^{-2}$. Half-cells were assembled inside a glove box (oxygen and water level<2 ppm) as coin cells (2032) with Celgard K2045 as separator and Li foil (15.6 mm diameter, 0.25 mm thickness) as counter and reference electrodes (two electrode configuration). The electrolyte was 1 mol $L^{-1}$ lithium hexafluorphosphate ($LiPF_6$) dissolved in 1:1:1 ethylene carbonate:dimethylcarbonate:diethylcarbonate (EC:DMC:DEC) (MTI corporation). The electrodes were first prelithiated by resting a Li foil wetted with electrolyte over the GCNT electrodes for 10 minutes.

The galvanostatic charge-discharge curves were tested from 0.1 to 50 A g$^{-1}$. Before the assembling of the full GCNT lithium ion capacitor, the anode and cathode half-cells were cycled 5× at 0.2 A g$^{-1}$. The cathode half-cell ended the cycle at the charged state at 4.5 V. The anode half-cell ended the testing at a discharged state at 0.01 V versus Li/Li$^+$. The two cells were opened inside the glove box and re-assembled as a full GCNT capacitor and tested in the voltage range of 0.01 to 4.3 V. The mass ratio was 5:1 cathode:anode.

Example 1.4. Characterization

SEM images were obtained using a JEOL 6500F SEM to examine the morphology of the GCNT samples. TEM images were captured using a 200 kV JEOL JEM-2100F TEM. Raman spectra were recorded with a Renishaw Raman RE01 scope using a 514.5 nm Ar$^+$ excitation line. Chemical compositions and elemental oxidation states of the samples were investigated by X-ray photoelectron spectroscopy (XPS) using a PHI Quantera SXM Scanning X-ray microprobe. Structural composition was analyzed by X-Ray diffraction using Rigaku D/Max Ultima II XRD. Electrical conductivity was measured at ambient conditions with a 4155C Agilent semiconductor parameter analyzer.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method comprising:
   providing a substrate having a substrate surface;
   wetting the substrate surface with a catalyst solution having:
      a liquid; and
      catalytic nanoparticles in the liquid, each catalytic nanoparticle including:
         a metal component; and
         a buffer component surrounding the metal component, wherein
            the metal component is in a form of a catalytic particle core of at least one of a metal or an oxide of the metal, and
            the buffer component is in a form of a buffer layer on a surface of the catalytic particle core;
   applying a carbon source on the substrate surface; and
   growing carbon nanotubes on the substrate surface.

2. The method of claim 1, wherein the metal component consists essentially of iron.

3. The method of claim 1, wherein the metal component comprises a metal oxide.

4. The method of claim 1, the buffer component comprising buffer particles.

5. The method of claim 1, the buffer component comprising at least one of aluminum or aluminum oxide.

6. The method of claim 1, the buffer component comprising amorphous aluminum oxide.

7. The method of claim 1, wherein the metal component comprises a metal-component surface and the buffer component comprises buffer particles on the metal-component surface.

8. The method of claim 1, wherein the metal component consists essentially of iron oxide and the buffer component consists essentially of aluminum-oxide particles.

9. The method of claim 1, wherein a molar ratio of the metal component to the buffer component is 1:1.

10. The method of claim 1, the catalytic nanoparticles further comprising a passivation layer.

11. The method of claim 1, wherein the substrate surface is porous.

12. The method of claim 1, wherein the substrate comprises a porous metal.

13. The method of claim 1, the metal component comprising an oxide of a metal, the method further comprising heating the wetted substrate surface to convert the oxide of the metal to the metal.

14. The method of claim 13, the buffer component comprising AlO$_x$, the method further comprising heating the wetted substrate surface to convert the AlO$_x$ to Al$_2$O$_3$.

15. A method for growing carbon nanotubes on a substrate surface, the method comprising:
   wetting the substrate surface with a catalyst solution having:
      a liquid; and
      catalytic nanoparticles in the liquid, each catalytic nanoparticle including a metal component surrounded by buffer nanoparticles, wherein the buffer nanoparticles comprise molecular clusters;
   applying a carbon source to the substrate surface; and
   growing carbon nanotubes from the catalytic nanoparticles on the substrate surface.

16. The method of claim 15, further comprising reducing the catalytic nanoparticles on the substrate surface after the wetting.

17. The method of claim 15, the catalyst solution further having a dispersing agent.

18. The method of claim 17, wherein the dispersing agent comprises a surfactant.

19. The method of claim 18, wherein the surfactant comprises oleic acid.

20. The method of claim 15, wherein the substrate surface comprises a layer of graphene.

21. The method of claim 20, wherein the wetting wets the layer of graphene.

22. The method of claim 15, wherein the catalytic nanoparticles comprise Fe and the buffer nanoparticles comprise Al at a molar ratio of Al:Fe in the range between 0.01:1 and 2:1.

23. The method of claim 15, wherein the catalytic nanoparticles comprise Fe$_3$O$_4$, the method further comprising reducing the Fe$_3$O$_4$ on the substrate surface before applying the carbon source to the substrate surface.

24. The method of claim 23, wherein the buffer nanoparticles comprise AlO$_x$.

25. The method of claim 15, wherein the catalytic nanoparticles have a diameter, and wherein the diameter of a majority of the catalytic nanoparticles is between five nanometers and ten nanometers.

* * * * *